(12) United States Patent
Park et al.

(10) Patent No.: US 9,264,192 B2
(45) Date of Patent: Feb. 16, 2016

(54) COORDINATED MULTI-POINT TRANSMISSION AND RECEPTION METHOD IN OVERLAID CELL ENVIRONMENT

(71) Applicant: Electronics and Telecommunications Research Institute, Daejeon-si (KR)

(72) Inventors: Soon Gi Park, Daejeon-si (KR); Hyung Sub Kim, Daejeon-si (KR); Sung Gu Choi, Daejeon-si (KR); Byung Han Ryu, Daejeon-si (KR); Nam Hoon Park, Daejeon-si (KR)

(73) Assignee: Electronics and Telecommunications Research Institiute, Daejeon (KR)

( * ) Notice: Subject to any disclaimer, the term of this patent is extended or adjusted under 35 U.S.C. 154(b) by 176 days.

(21) Appl. No.: 14/045,436

(22) Filed: Oct. 3, 2013

(65) Prior Publication Data
US 2014/0241323 A1    Aug. 28, 2014

(30) Foreign Application Priority Data
Feb. 25, 2013   (KR) ........................ 10-2013-0019899

(51) Int. Cl.
*H04W 24/08* (2009.01)
*H04L 5/00* (2006.01)
*H04W 36/00* (2009.01)
*H04W 84/04* (2009.01)

(52) U.S. Cl.
CPC ......... *H04L 5/0035* (2013.01); *H04W 36/0055* (2013.01); *H04W 84/045* (2013.01)

(58) Field of Classification Search
CPC .. H04L 5/0048; H04W 72/042; H04W 24/10; H04W 36/30

USPC ................... 370/329, 331, 332; 455/436, 450
See application file for complete search history.

(56) References Cited

U.S. PATENT DOCUMENTS

| | | | |
|---|---|---|---|
| 2010/0202311 A1* | 8/2010 | Lunttila et al. | 370/252 |
| 2010/0254335 A1* | 10/2010 | Koo et al. | 370/329 |
| 2011/0034175 A1* | 2/2011 | Fong et al. | 455/450 |
| 2011/0281585 A1* | 11/2011 | Kwon et al. | 455/436 |
| 2012/0287875 A1* | 11/2012 | Kim et al. | 370/329 |
| 2012/0327800 A1* | 12/2012 | Kim et al. | 370/252 |

(Continued)

FOREIGN PATENT DOCUMENTS

| | | |
|---|---|---|
| EP | 2359634 B1 | 8/2011 |
| KR | 10-2010-0126101 | 12/2010 |
| KR | 1020110100629 | 9/2011 |
| KR | 10-2012-0084592 | 7/2012 |

OTHER PUBLICATIONS

Ipark, Soon-Gi et al., "The Impact of Claud Base Station's Coordinated Multi-point Schemes on Mobility Performance," 2012 International Conference on ICT Convergence, pp. 660-665 (2012).

*Primary Examiner* — Dang Ton
*Assistant Examiner* — Sai Aung
(74) *Attorney, Agent, or Firm* — Nelson Mullins Riley & Scarborough LLP

(57) ABSTRACT

According to the present invention, a method of performing coordinated multipoint transmission and reception in an overlaid cellular system in which a first base station and a second base station overlay each other, the method comprising performing a handover using a coordinated multi-point transmission and reception scheme based on Channel State Indicator-Reference Signal (CSI-RS) information of user equipment by the first and second base stations.

13 Claims, 23 Drawing Sheets

(56) References Cited

U.S. PATENT DOCUMENTS

2013/0028109 A1* 1/2013 Jongren et al. ............... 370/252
2013/0044707 A1* 2/2013 Chen ............................ 370/329
2014/0153545 A1* 6/2014 Dimou et al. ................. 370/332
2014/0247748 A1* 9/2014 Kang et al. ................... 370/252

* cited by examiner

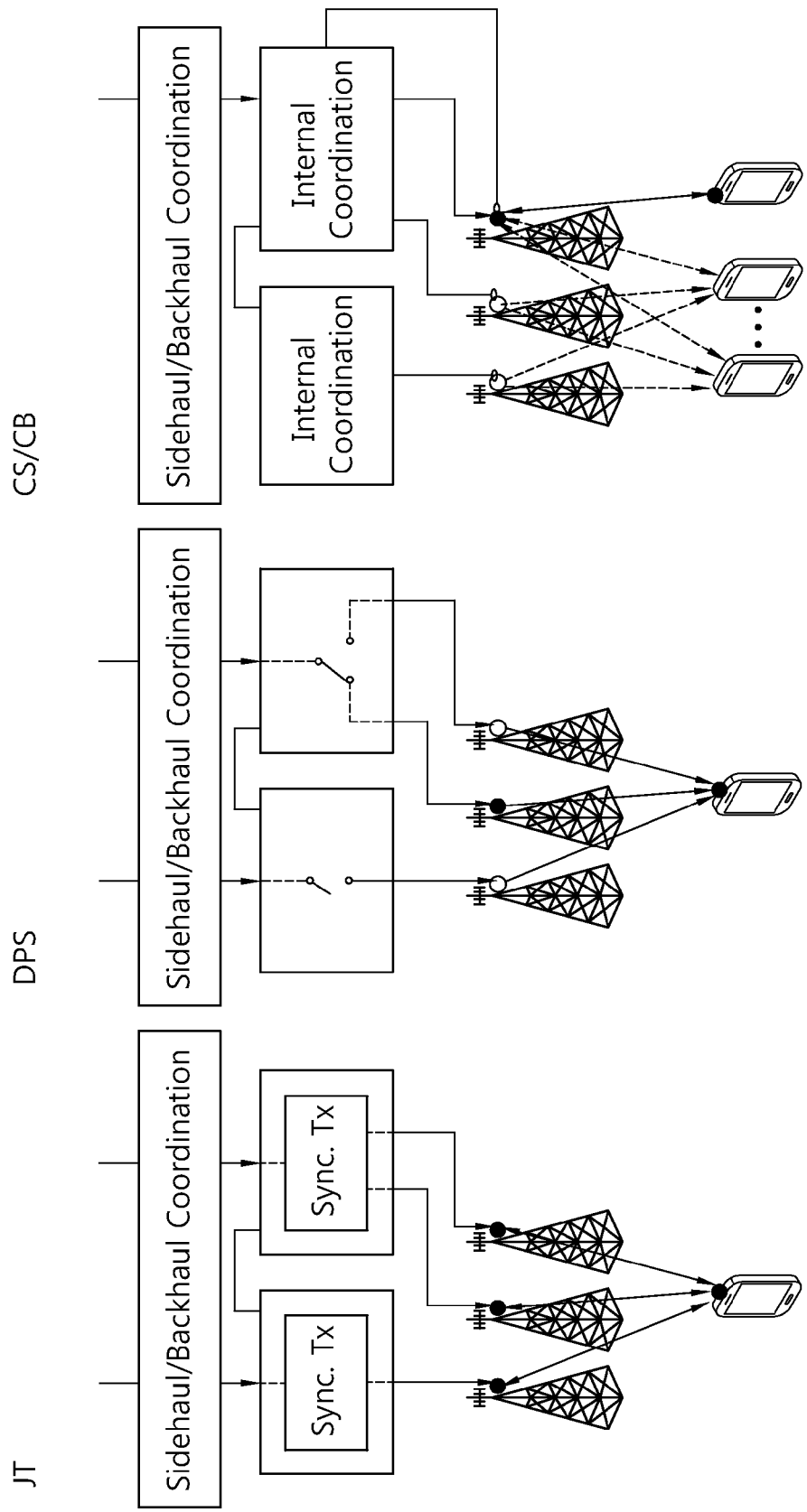

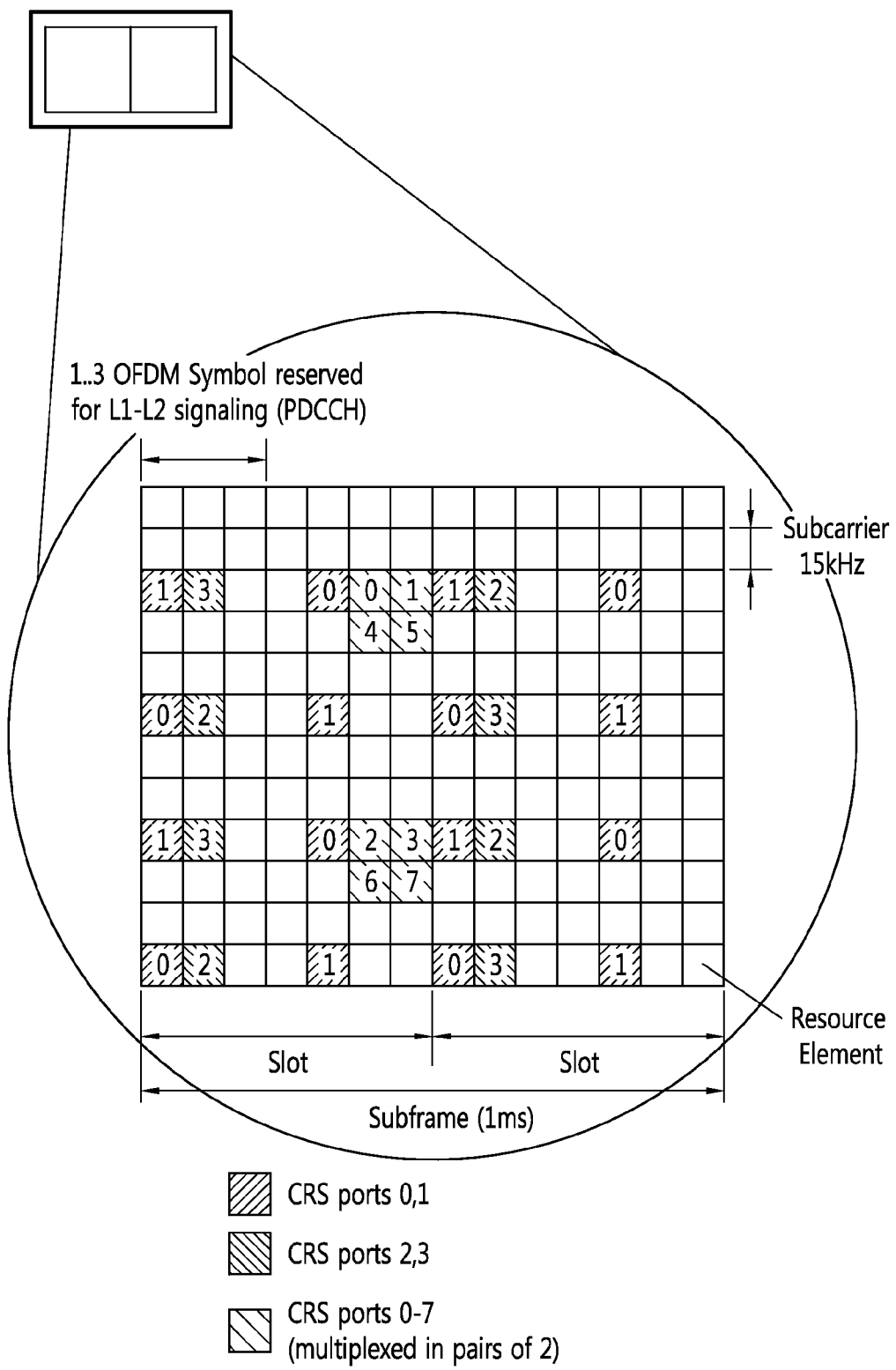

FIG. 14A
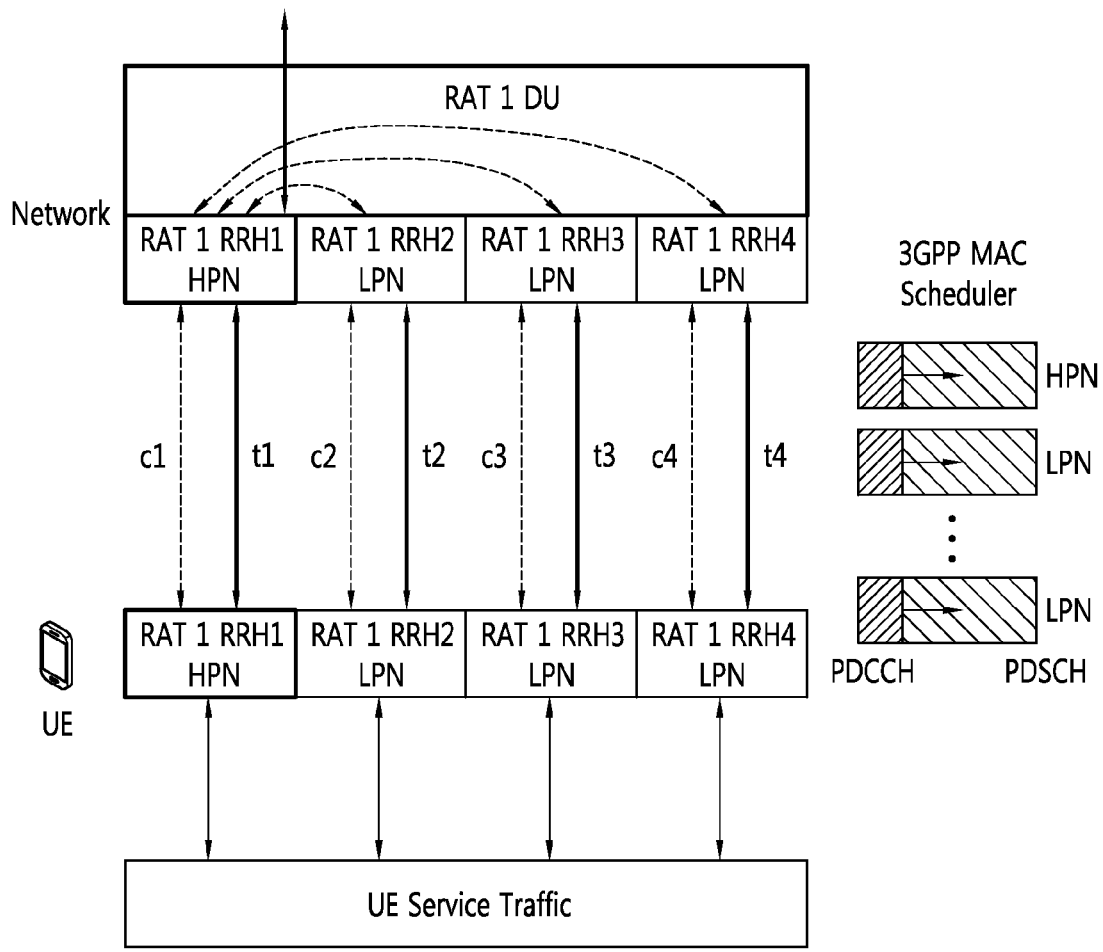
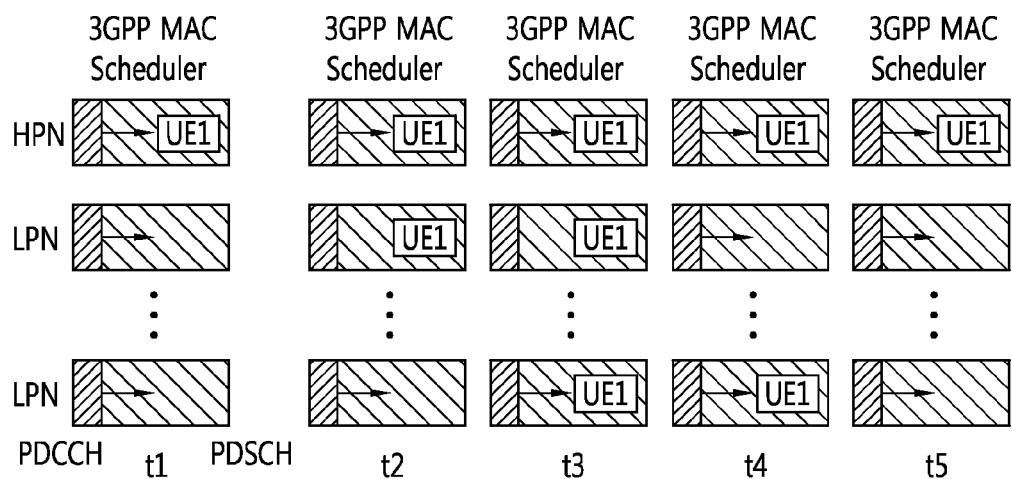

COORDINATED MULTI-POINT TRANSMISSION AND RECEPTION METHOD IN OVERLAID CELL ENVIRONMENT

CROSS-REFERENCE TO RELATED APPLICATION

This application claims priority to Korean Patent Application No. 10-2013-0019899 filed on 25 Feb. 2013, the contents of which are herein incorporated by reference in its entirety.

BACKGROUND OF THE INVENTION

1. Technical Field

The present invention concerns a coordinated multi-point transmission and reception method, and more specifically, to a coordinated multi-point transmission and reception method for robust handover in a mobile communication system under an overlaid cell and a new cloud base station environment.

2. Discussion of the Related Art

Currently, 3GPP LTE (Long Term Evolution)-based systems base their handover on hard handover. However, hard handover essentially needs to have accurate handover time, and incorrect handover time leads to a deterioration of mobility and may cause an area where communication is impossible. In particular, in future cell environments, handover may be more frequent, thus resulting in service quality being drastically down. Accordingly, a need exists for addressing such problems.

SUMMARY OF THE INVENTION

To address the above problems, an object of the present invention is to provide a coordinated multi-point transmission and reception method that includes an existing macro cell arrangement using CoMP (Coordinated Multiple Point) transmission and reception so that various small cells are arranged in the macro cell and a cloud base station environment that may intensively process cells, thereby enhancing handover performance.

To achieve the above objects, a method of performing coordinated multi-point transmission and reception in an overlaid cellular system in which a first base station and a second base station overlay each other may comprise performing a handover using a coordinated multi-point transmission and reception scheme based on Channel State Indicator-Reference Signal (CSI-RS) information of user equipment by the first and second base stations.

Performing the handover may comprise preparing for performing coordinated multi-point transmission and reception based on the Channel State Indicator-Reference Signal (CSI-RS) information of the user equipment by the first base station and initiating coordinated multi-point transmission and reception by the first and second base stations.

The first base station may be a base station covering a macro cell, and the second base station may be a neighboring cell covering a pico cell or a femto cell included in the macro cell covered by the first base station.

Performing the handover may comprise a basic packet transmission and reception step of transmitting and receiving downlink and uplink packets respectively using a PDSCH (Physical Downlink Shared Channel) and a PUSCH (Physical Uplink Shared Channel) by DL/UL grant information of CI (Control Information) information and a PDCCH (Physical Downlink Control Channel) by the user equipment accessing an RRH (Remote Radio Head) of the first base station.

Performing the handover may comprise a coordinated multi-point add modification step for adding a third base station that is included in the first base station and that is a neighboring cell of the second base station while the coordinated multi-point transmission and reception is performed by the first and second base stations, a coordinated multi-point exclude modification step of excluding the second base station while the coordinated multi-point transmission and reception is performed by the first, second, and third base stations, and a step of terminating the coordinated multi-point transmission and reception by excluding the third base station from the coordinated multi-point transmission and reception attended by the first and third base stations.

The coordinated multi-point transmission and reception preparation step may comprise controlling the measurement information configuration of the user equipment by the RRC of the first base station using an RRC connection reconfiguration message, preparing measurement by the user equipment according to a measurement control request of the RRC connection reconfiguration message and transmitting a measurement preparation complete message to the first base station, and reporting a measurement report for a CSI-RS (Channel State Indicator-Reference Signal) to the first base station by the user equipment based on a measurement control determination reference and a reporting scheme provided from the first base station.

Initiating the coordinated multi-point transmission and reception may comprise analyzing the measurement report provided from the user equipment by the first base station, determining whether to include the second base station in the coordinated multi-point measurement set by the first base station, and transmitting configuration information for per-UE CSI feedback relating to the first and second base stations based on the determination to the user equipment, preparing for CSI feedback according to a CSI feedback configuration request of the first RRC connection reconfiguration message by the user equipment, and when the preparation is complete, transmitting an RRC connection reconfiguration complete message to the first base station by the user equipment, performing CSI feedback on a PUCCH or a PUSCH for the first and second base stations according to a CSI feedback configuration request by the user equipment, and performing a JT (Joint Transmission) or a JR (Joint Reception) on a PDSCH or PUSCH of each of the first base station and the second base station using the PDCCH of the first base station.

The coordinated multi-point add modification step may comprise analyzing the measurement report provided from the user equipment by the first base station, determining whether to include the third base station in a coordinated multi-point measurement set including the first and second base stations by the first base station, and transmitting a configuration information modification for per-UE CSI feedback relating to the first and second base stations to the user equipment through a second RRC connection reconfiguration message by the first base station, preparing for CSI feedback according to a CSI feedback configuration modification request of the second RRC connection reconfiguration message by the user equipment, and when the preparation is complete, transmitting a second RRC connection reconfiguration complete message to the first base station by the user equipment, performing CSI feedback on a PUCCH or PUSCH for the first base station, the second base station, and the third base station according to a CSI feedback configuration request of the second RRC connection reconfiguration message by the user equipment, and performing a joint transmission or a joint reception on PDSCH or PUSCH of each of the first base station, the second base station, and the third base station using the PDCCH of the first base station.

The coordinated multi-point exclude modification step may comprise analyzing a measurement report provided from the user equipment by the first base station, determining whether not to include the second base station in a coordinated multi-point measurement set including the first base station, the second base station, and the third base station, and if it is determined that coordinated multi-point transmission and reception is possible in the first base station and the third base station, transmitting a configuration information modification for per-UE CSI feedback relating to the first base station and the third base station to the user equipment through a third RRC connection reconfiguration message, preparing for CSI feedback according to a CSI feedback configuration modification request of the third RRC connection reconfiguration message by the user equipment, and if the preparation is complete, transmitting a third RRC connection reconfiguration complete message to the first base station, performing CSI feedback on a PUCCH or a PUSCH for the first base station and the third base station according to the CSI feedback configuration modification request of the third RRC connection reconfiguration message by the user equipment, and performing a joint transmission or a joint reception on the PDSCH or PUSCH of each of the first base station and the third base station using the PDCCH of the first base station.

The coordinated multi-point transmission and reception terminating step may comprise analyzing a measurement report provided from the user equipment by the first base station, determining whether to release the coordinated multi-point transmission and reception, and if the coordinated multi-point transmission and reception is determined to be released, transmitting a configuration information modification allowing CSI feedback associated with the coordinated multi-point transmission and reception not to be performed to the user equipment through a fourth RRC connection reconfiguration message by the first base station and if the modification is complete according to the CSI feedback configuration modification request of the fourth RRC connection reconfiguration message, transmitting a fourth RRC connection reconfiguration complete message to the first base station.

To achieve the above objects, a method of scheduling a per-UE (Reference Signal) for coordinated multi-point (CoMP) transmission and reception by an HPN base station scheduler in an environment where an HPN (High Power Node) cell and an LPN (Low Power Node) cell co-exist, the method for coordinated multi-point transmission and reception in a heterogeneous network, the method may comprise allocating, without collision, an RS RE (Reference Signal Resource Element) relating to a per-cell CSI-RS (Channel State Indicator-Reference Signal) for the HPN and LPN cells.

The HPN base station scheduler may allocate a CRS (cell-specific reference signals) port to an RE corresponding to first and second rows and third, sixth, ninth, and twelfth columns of a PDCCH of a PRB (Physical Resource Block) and may allocate a CSI RS port to an RE corresponding to seventh and eighth rows and third, fourth, ninth, and tenth columns of the PRB not to overlap per base station.

The method may further comprise extracting a CSI-RS-related RE in an RB allocated to the per-UE subframe by user equipment, calculating an entire quality for the extracted CSI-RS-related RE during a constant period by the user equipment, and determining whether to apply coordinated multi-point transmission and reception based on the calculated entire quality information by the HPN base station scheduler.

To achieve the above objects, a scheduling apparatus of scheduling a per-UE RS (Reference Signal) for coordinated multi-point (CoMP) transmission and reception in an environment where an HPN (High Power Node) cell and an LPN (Low Power Node) cell co-exist, the scheduling apparatus for coordinated multi-point transmission and reception in a heterogeneous network, the scheduling apparatus may allocate, without collision, an RS RE (Reference Signal Resource Element) relating to a per-cell CSI-RS (Channel State Indicator-Reference Signal) for the HPN and LPN cells.

The scheduling apparatus may allocate a CRS (cell-specific reference signals) port to an RE corresponding to first and second rows and third, sixth, ninth, and twelfth columns of a PDCCH of a PRB (Physical Resource Block) and may allocate a CSI RS port to an RE corresponding to seventh and eighth rows and third, fourth, ninth, and tenth columns of the PRB not to overlap per base station.

The scheduling apparatus may determine whether to apply coordinated multi-point transmission and reception based on entire quality information for a CSI-RS-related RE during a constant period calculated from the user equipment.

To achieve the above objects, a scheduling method for coordinated multi-point transmission and reception, a base station scheduler performing downlink scheduling for coordinated multi-point (CoMP) transmission and reception in an environment where an HPN (High Power Node) cell and an LPN (Low Power Node) cell co-exist, the scheduling method may comprise performing scheduling for the coordinated multi-point transmission and reception for a base station covering at least one LPN cell by anchoring a PDCCH channel of a base station covering the HPN cell.

To achieve the above objects, a scheduling apparatus for coordinated multi-point transmission and reception, the scheduling apparatus performing downlink scheduling for coordinated multi-point (CoMP) transmission and reception in an environment where an HPN (High Power Node) cell and an LPN (Low Power Node) cell co-exist, the scheduling apparatus may perform scheduling for the coordinated multi-point transmission and reception for a base station covering at least one LPN cell by anchoring a PDCCH channel of a base station covering the HPN cell.

In the coordinated multi-point transmission and reception method according to the present invention, although delay exists at the X2 interface on the control plane, JT/JR (Joint Transmission/Joint Reception)-type CoMP may apply, and accordingly, mobility may be efficiently managed.

BRIEF DESCRIPTION OF THE DRAWINGS

The embodiments of the present invention will become readily apparent by reference to the following detailed description when considered in conjunction with the accompanying drawings wherein:

FIG. 3a is a view illustrating a downlink CoMP scheme (inter-(C)BS)

FIG. 13 is a view illustrating per-expanded RS-based user equipment RS allocation and measurement in a coordinated multi-point transmission and reception method according to another embodiment of the present invention;

FIGS. 14a and 14b are views illustrating HPN PDCCH anchoring operation for corresponding user equipment in a downlink CoMP scheduling processing method of a coordinated multi-point transmission and reception method according to another embodiment of the present invention;

DESCRIPTION OF THE EMBODIMENTS

Figure 1:
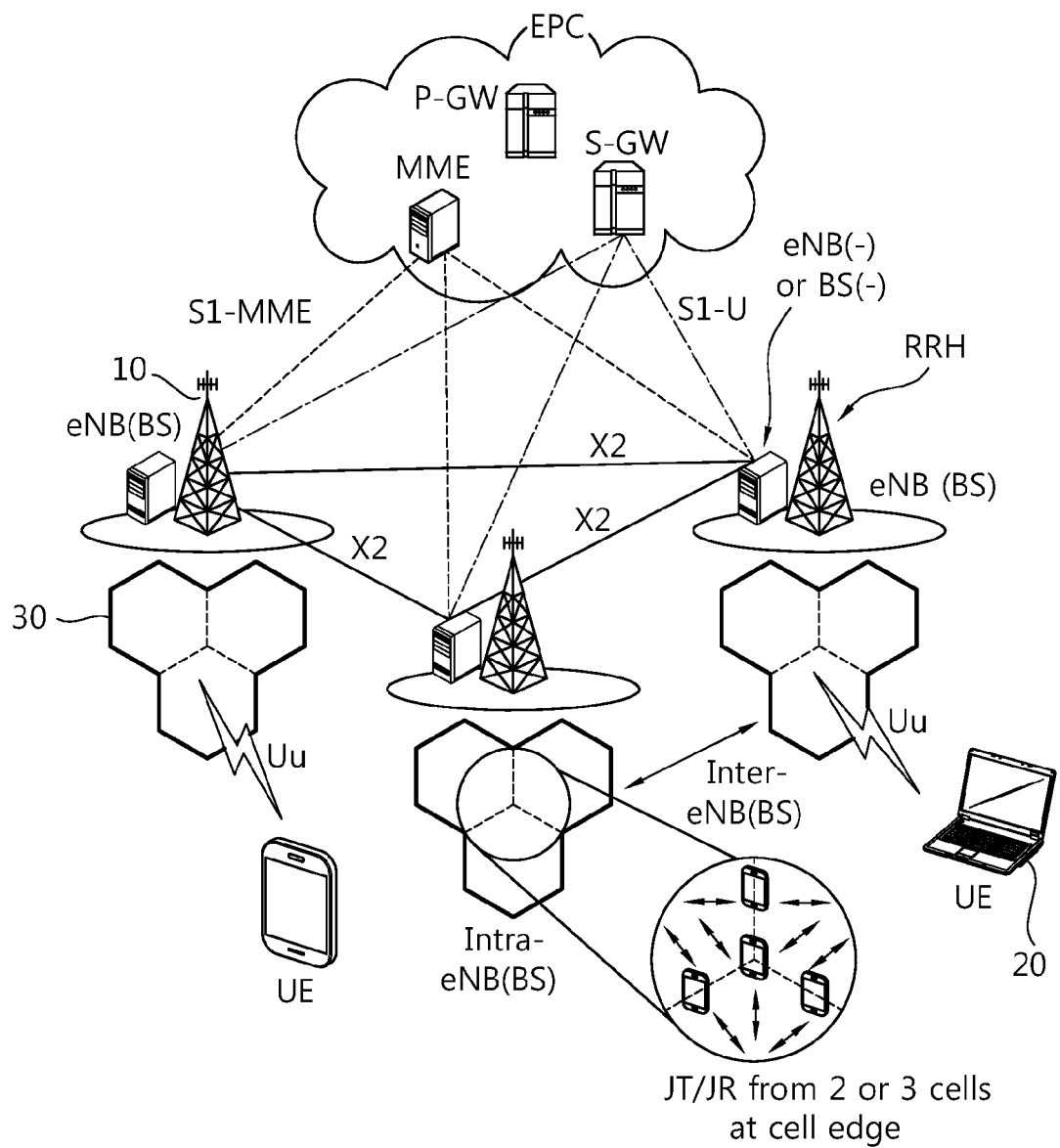
FIG. 1 is a view illustrating a structure a 3GPP LTE-based mobile communication system.

Various modifications may be made to the present invention and the present invention may have a number of embodiments. Specific embodiments are described in detail with reference to the drawings. However, the present invention is not limited to specific embodiments, and it should be understood that the present invention includes all modifications, equivalents, or replacements that are included in the spirit and technical scope of the present invention.

The terms "first" and "second" may be used to describe various components, but the components are not limited thereto. These terms are used only to distinguish one component from another. For example, the first component may be also named the second component, and the second component may be similarly named the first component. The term "and/or" includes a combination of a plurality of related items as described herein or any one of the plurality of related items.

When a component is "connected" or "coupled" to another component, the component may be directly connected or coupled to the other component. In contrast, when a component is directly connected or coupled to another component, no component intervenes.

The terms used herein are given to describe the embodiments but not intended to limit the present invention. A singular term includes a plural term unless otherwise stated. As used herein, the terms "include" or "have" are used to indicate that there are features, numerals, steps, operations, components, parts or combinations thereof as described herein, but do not exclude the presence or possibility of addition of one or more features, numerals, steps, operations, components, parts or components thereof.

Unless defined otherwise, all the terms used herein including technical or scientific terminals have the same meanings as those generally understood by those of ordinary skill. The terms defined in the generally used dictionaries should be understood as having meanings identical to those interpreted in the context, and unless defined otherwise, the terms should not be interpreted excessively formal.

Hereinafter, preferred embodiments of the present invention will be described in greater detail with reference to the accompanying drawings. The same reference numerals refer to the same components throughout the drawings, and the description of the same components is not repeated.

Basically, coordinated multi-point (CoMP) transmission and reception services are technology for enhancing cell edge throughput of user equipment that is nearly stationary at a cell edge. In the present invention, however, the CoMP transmission/reception technology, in light of enhancement of mobility, is expanded to user equipment that is moving at high speed, thereby leading to better service quality and mobility.

FIG. 1 is a view illustrating a structure a 3GPP LTE-based mobile communication system. Referring to FIG. 1, the 3GPP LTE mobile communication system may include an EPC (Evolved Packet Core), a base station 10, and user equipment (UE) 20. The EPC is a core network for controlling each base station and includes P-GW (PDN-Gateway), S-GW (Serving Gateway) and MME (Mobility Management Entity). The MME is a control-plane node of the EPC, the S-GW is a user plane node to connect the EPC to an LTE radio access network (RAN), and the P-GW users an SGi interface to connect the EPC to a user plane external network (e.g., Internet). The base station 10 may be referred to as BS (Base Station) or eNB (evolved Node B). X2 communication is performed between base stations 10. Assume that the base station 10 performs S1-MME communication with the MME, S1-U communication with the GW, and Uu communication wirelessly with the UE 20. One base station 10 covers three cells 30 (e.g., sectored cells), and the term "Intra-BS" is used in the three cells 30 covered by one base station 10. The term "Inter-BS" is used between cells respectively belonging to different base stations.

Figure 3B:
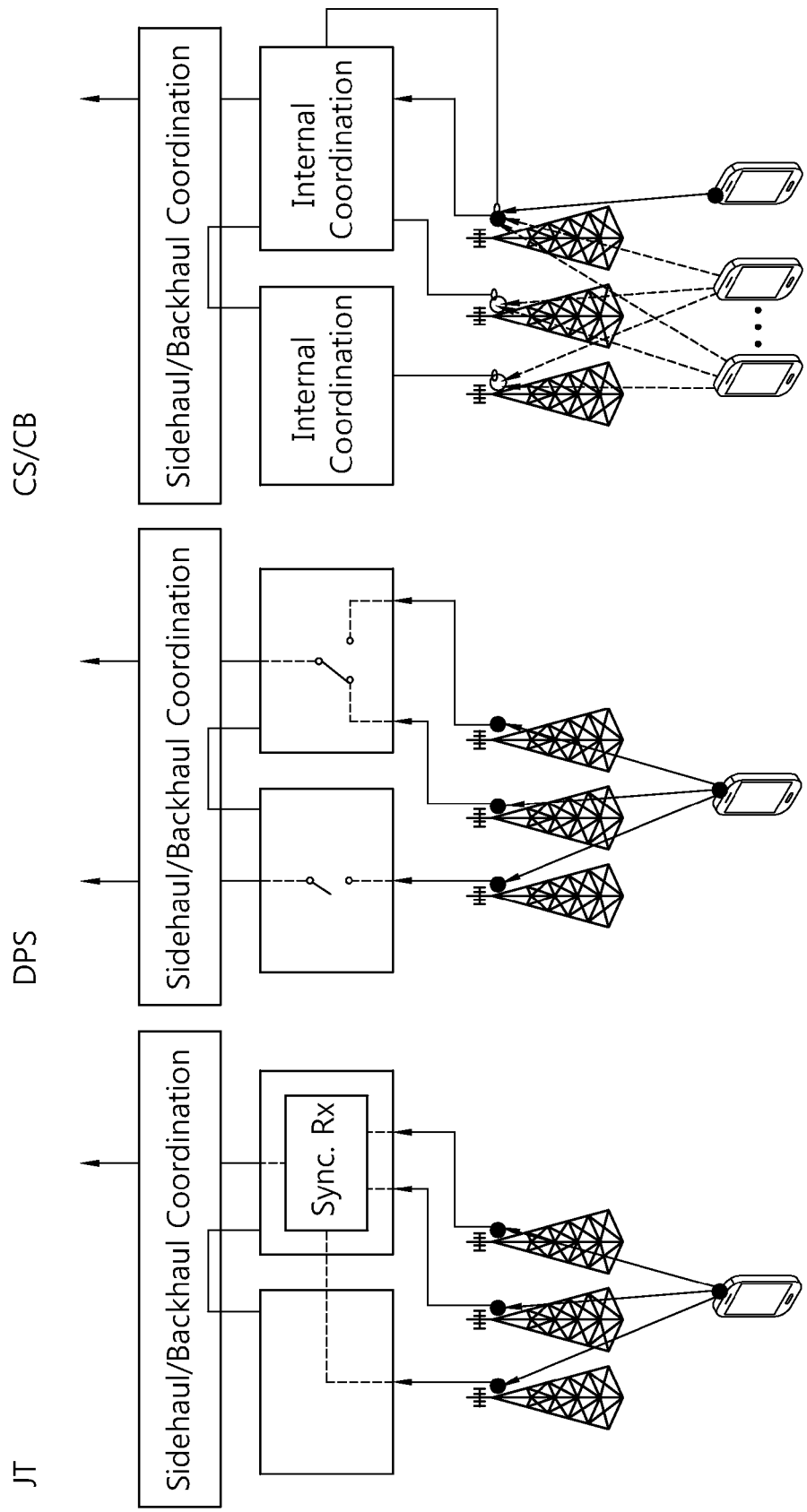
FIG. 3b is a view illustrating an uplink CoMP scheme (intra-(C)BS)
Figure 4:
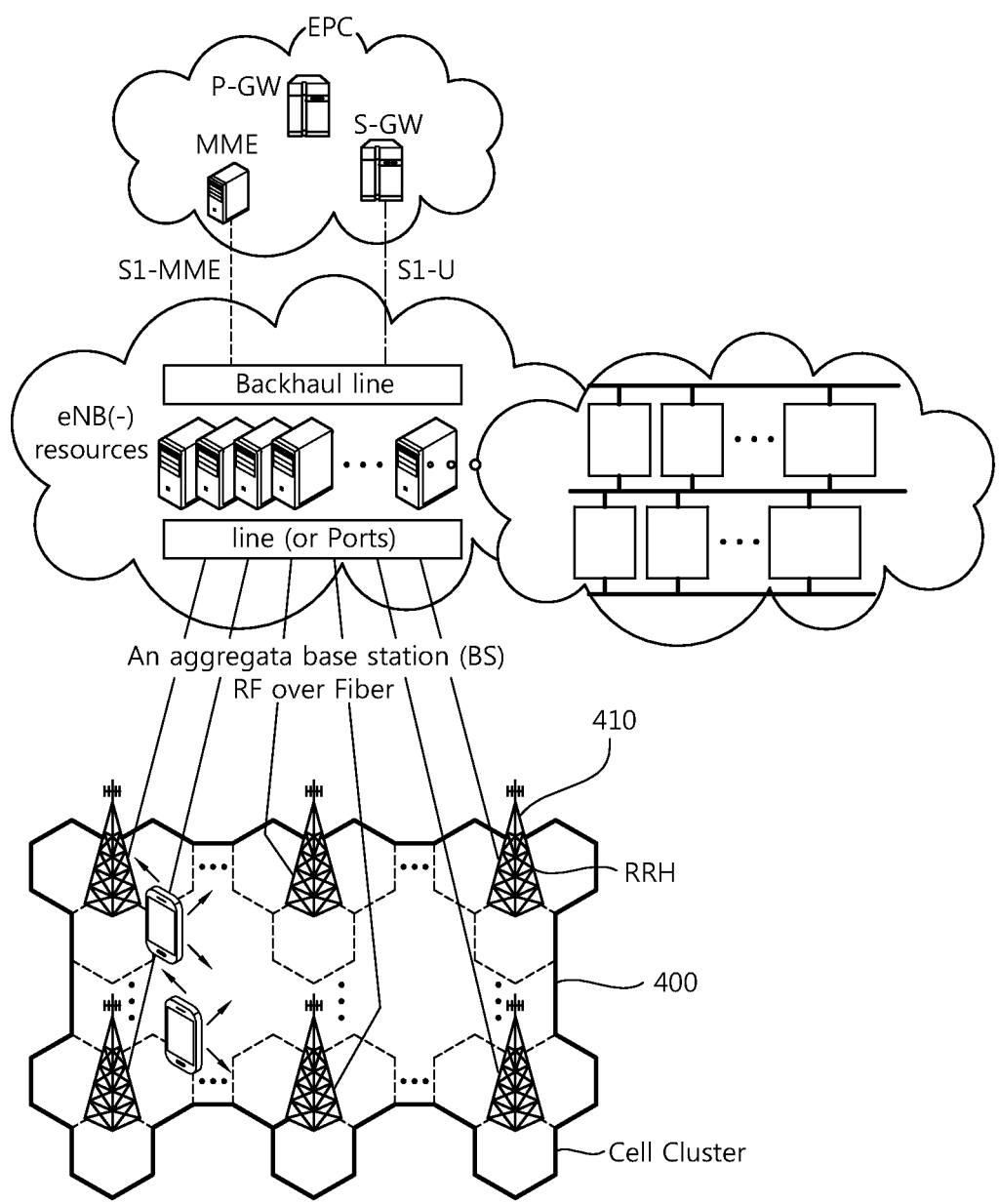
FIG. 4 is a view illustrating a cloud base station.

Referring to FIG. 4, an integrated base station using RRH (Remote Radio Head) is a sort of distributed antenna system that processes geographically distributed antennas at a single site and may this integrated base station, contrary to Intra-BS, may incorporate more cells into a single base station 10. At this time, such a new base station is referred to as CBS (Cloud Base Station), the term "Inta-CBS" may be used to represent "between cells belonging to one CBS," and the term "Inter-CBS" may be used to represent "between cells respectively belonging to different CBSs." From a comparison between FIG. 1 and FIG. 3, the base station architecture as shown in FIG. 3 may allow many geometrically distributed cells to be handled at a single site, thus leading to an increase in scale of the cell-processing type such as the Intra-BS shown in FIG. 1 (for example, an increase in the number of cells included in the Intra-CBS).

Figure 2A:
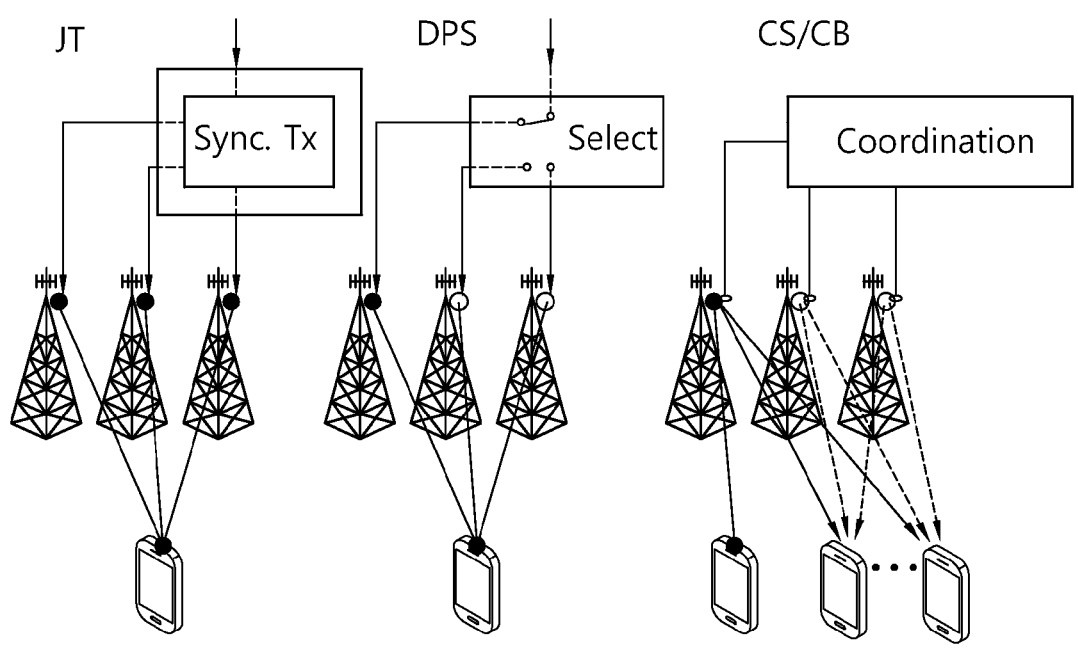
FIG. 2a is a view illustrating a downlink CoMP scheme (intra-(C)BS)
Figure 2B:
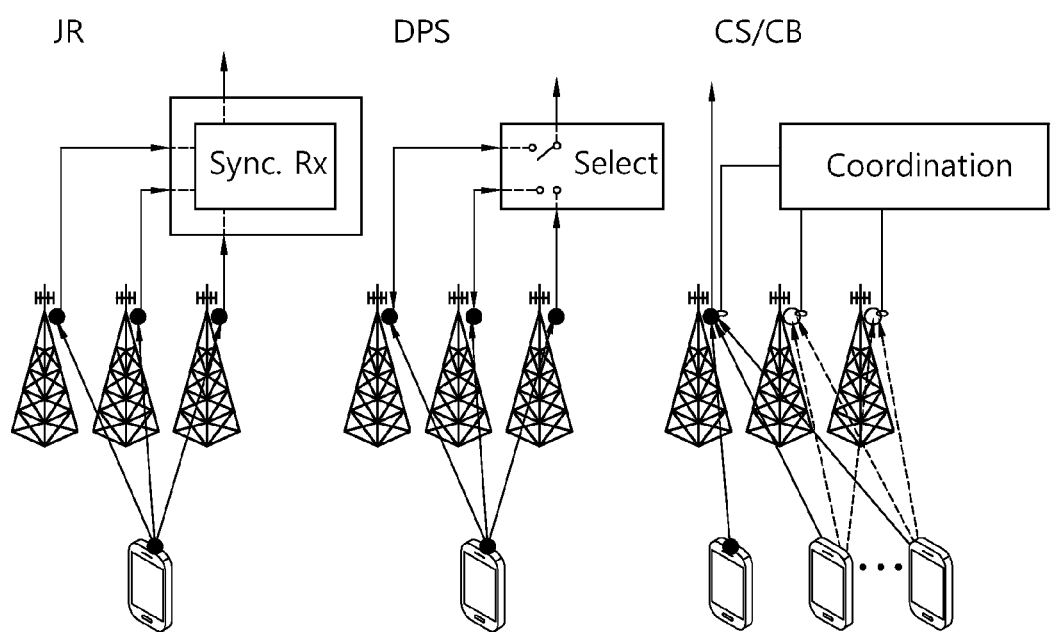
FIG. 2b is a view illustrating uplink CoMP scheme (intra-(C)BS)

FIG. 2a is a view illustrating a downlink CoMP scheme (intra-(C)BS), and FIG. 2b is a view illustrating uplink CoMP scheme (intra-(C)BS).

Referring to FIG. 2a, in the downlink CoMP scheme (intra-BS), JT is conducting synchronous communication (Sync. Tx) at three transmission points based on one backhaul traffic. DPS (Dynamic Point (Cell) Selection) is determined at only one of three transmission points at one time based on one backhaul traffic, and such determination may be changed on a per-subframe basis (resultantly, a downlink DPS algorithm is required to determine the optimum downlink transmission point at the corresponding time). CS/CB (Coordinated Scheduling/Coordinated Beamforming), in the situation where a specific transmission point is fixed through which one backhaul traffic goes, conducts coordinated scheduling/beamforming between other transmission points including the specific transmission point (this ends up leading to a need for a CS/CB algorithm to form the optimal situation for a corresponding downlink point of interest through beamforming and scheduling of other access points that may influence the corresponding downlink point of interest).

Referring to FIG. 2b, in the uplink CoMP scheme (intra-(C)BS), JR is conducting synchronous reception (Sync. Rx) at three reception points. DPS may have data (signals) arrive at three reception points, however, only one of three reception points is determined at one time, and such determination may be varied on a per-subframe basis (this resultantly leads to a need for an uplink DPS algorithm to determine the optimal uplink transmission point at the corresponding time). CS/CB, in the circumstance where a reception point has been determined through which one uplink signal travels, performs coordinated scheduling/beamforming between other reception points including the reception point (which may end up an uplink CS/CB algorithm being required to provide the optimal situation for a corresponding uplink point of interest through beamforming and scheduling of other access points that may influence the corresponding uplink point of interest).

FIG. 3a is a view illustrating a downlink CoMP scheme (inter-(C)BS), and FIG. 3b is a view illustrating an uplink CoMP scheme (intra-(C)BS).

Referring to FIG. 3a, in the downlink CoMP scheme (intra-(C)BS), JT is conducting synchronous transmission (Sync. Tx) at three transmission points based on two backhaul traffics and needs sidehaul/backhaul coordination for synchronous transmission between base stations (at this time, a method may be used in which only one base station receives the backhaul traffics that are forwarded to the other base station). DPS is determined for only one of the three transmission points at any one time based on two backhaul traffics per (C)BS, and such determination may be varied on a per-subframe basis. To select transmission point between base stations, sidehaul/backhaul coordination is needed (a downlink DPS algorithm may be required that is distributed to the base station, and the method may be likewise used in which backhaul traffic is received by one (C)BS and is forwarded to the other base station). CS/BS, while it has been determined through which transmission point one backhaul traffic goes, conducts coordinated scheduling/beamforming between other transmission points including the transmission point, and for purposes of CS/CB between base stations, sidehaul/backhaul coordination is needed (a downlink CS/CB algorithm between two (C)BSs may be required).

Referring to FIG. 3b, in the uplink CoMP scheme (intra-(C)BS), JR is conducting synchronous reception (Sync. Rx) from three reception points. For inter-base station synchronous reception, sidehaul/backhaul coordination is needed (at this time, a path should be secured of being able to send an uplink signal from another (C)BS to a still other (C)BS). DPS may have data (signals) arrive at three reception points. However, only one of the three reception points is determined at one time, and such determination may be varied on a per-subframe basis. For inter-(C)BS selection, sidehaul/backhaul coordination is required (an uplink DPS algorithm may be required that is distributed between (C)BSs). CS/BS, while it has been determined through which reception point one uplink signal goes, performs coordinated scheduling/beamforming between other reception points including the reception point. For inter-(C)BS CS/CB, sidehaul/backhaul coordination is needed (an uplink CS/CB algorithm may be required that is distributed between base stations).

A comparison between FIGS. 2a/2b and FIGS. 3a/3b shows that sidehaul/hackhaul coordination is needed for applying CoMP to between base stations. Such interface being needed may mean that a CoMP scheme should be developed considering delay of interface or may mean on the contrary that it is impossible to apply CoMP to between Inter-(C)BSs in the JP (JT/JR, DPS) schemes requiring fast coordination. What is intended herein is that sidehaul/backhaul coordination may have JP-type CoMP applied in the base station at very high speed in the future. Further, by increasing the scale of the cloud base station through a currently applicable cloud base station architecture, more cells than those possessed by the existing base station may be managed while JP-type CoMP may be applicable to all cells covered by the cloud base station.

FIG. 4 is a view illustrating a cloud base station 400.

Referring to FIG. 4, there may be a new type of base station that applies RRHs (Remote Radio Heads) 410 having an RF front-end function so that while the RRHs 410 stay at the positions of the existing base stations, transmission/reception signals from the RRHs 410 are collected at one site and are intensively processed (hereinafter, such new base station is referred to as cloud base station (CBS) 400). All cells generated by RRHs 410 belonging to one cloud base station 400 may be referred to as one cell cluster, and one cell cluster is considered corresponding to one cloud base station 400. In such a cell cluster, the concepts of CoMP downlink JP (JT, DPS) and downlink JP (JR, DPS) that are the same in concept as the Intra-BS shown in FIG. 1 may be applicable to all the cells in the cell cluster. Accordingly, as compared with existing base stations, the more cells belong to the cell cluster of the cloud base station 400, the more CoMP downlink JP (JT, DPS) and downlink JP (JR, DPS) may apply.

As traffic increases in the Intra-BS which is an existing base station in concept as shown in FIG. 1 or in the cell cluster that is a new base station as shown in FIG. 4, it is easier to apply CoMP downlink JT and downlink JR. The reason will be described below in connection with FIGS. 5 and 6. In other words, real-time information exchange is needed for synchronous transmission and synchronous reception, however occurrence of sidehaul/bachhaul causes it difficult. That is, if traffic pattern is irregular (for example, when traffic amount and arrival time are inconsistent) and this is, as is, used for scheduling, synchronous transmission/reception (Tx/Rx) may be hard to achieve at each time.

Figure 5:
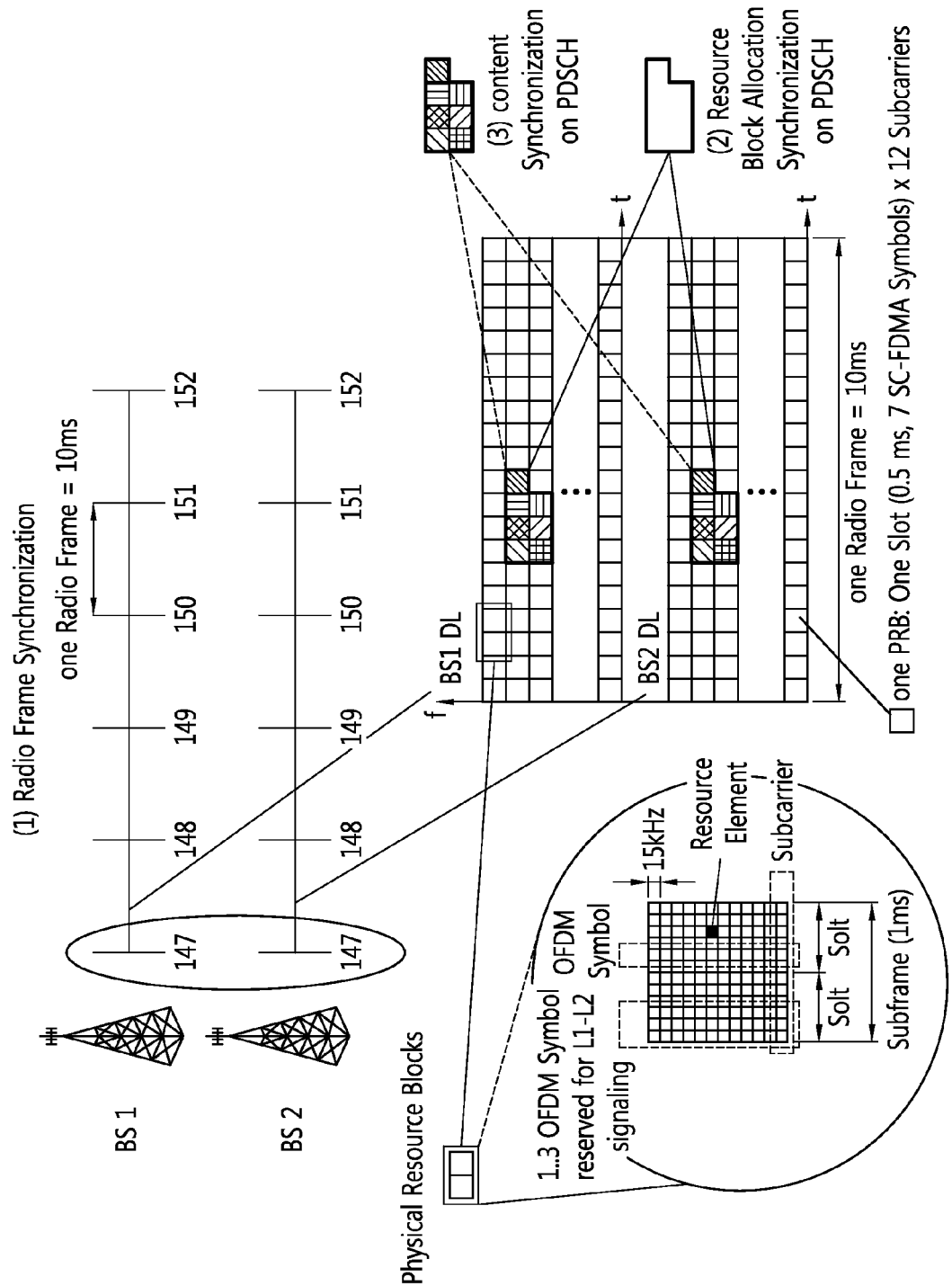
FIG. 5 is a view illustrating a concept of downlink CoMP JT synchronous transmission.

FIG. 5 is a view illustrating a concept of downlink CoMP JT synchronous transmission. Referring to FIG. 5, an embodiment of the concept of downlink CoMP JT synchronous transmission is shown (actual mapping may mean allocation of RB (Resource Block) over PDSCH (Physical Downlink Shared CHannel) excluding PDCCH (Physical Downlink Control CHannel). As shown in FIG. 5, three types of sync are required for radio frame. First, radio frame sync should be done, second, resource allocation in PDSCH for corresponding CoMP UE should be consistent, and finally information allocated to PRB (Physical Resource Block) should be the same.

Figure 6:
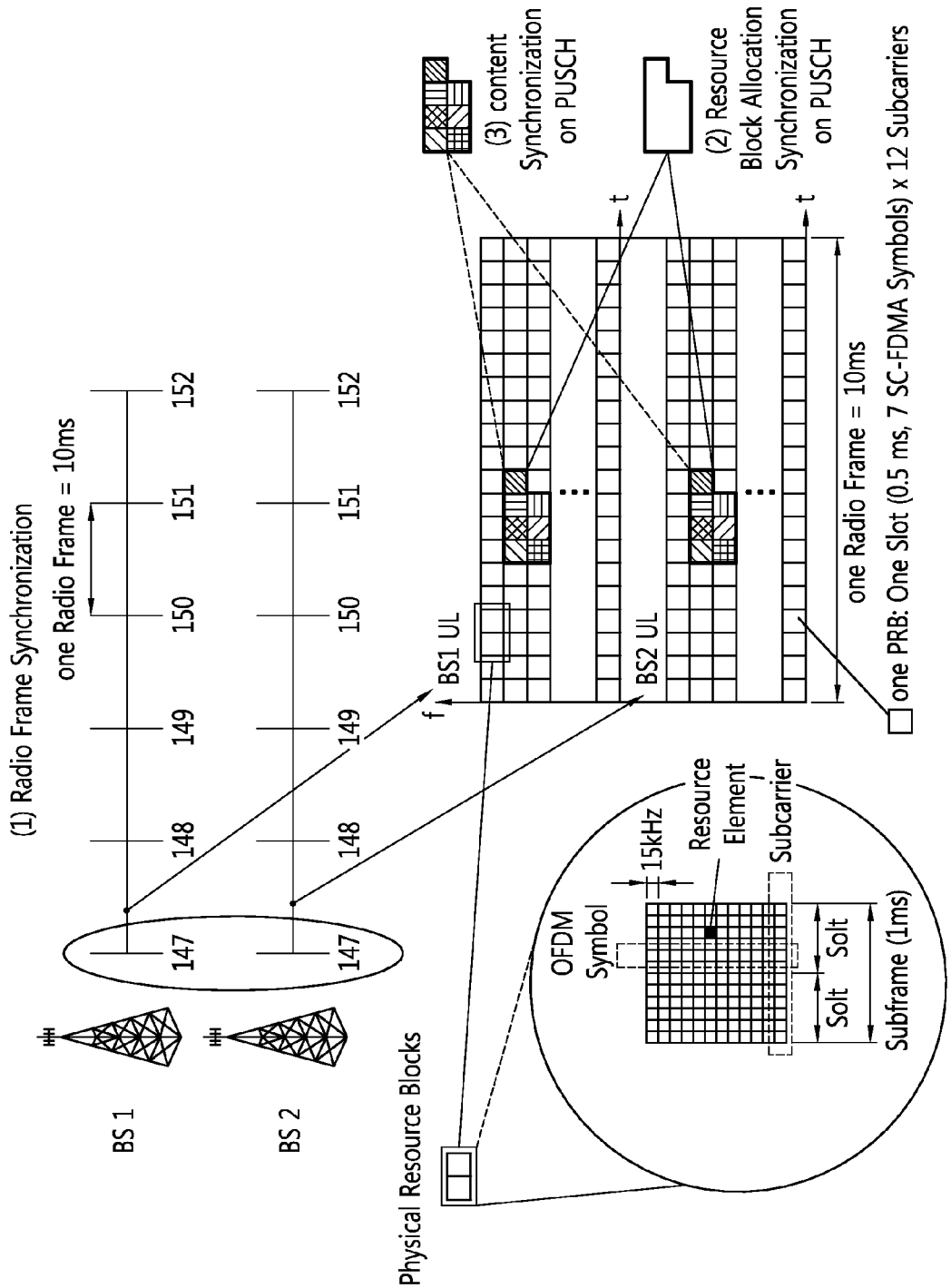
FIG. 6 is a view illustrating a concept of uplink CoMP JR synchronous reception.

FIG. 6 is a view illustrating a concept of uplink CoMP JR synchronous reception. Referring to FIG. 6, a conceptual embodiment of uplink CoMP JR synchronous reception is shown (actually, hopping is done and thus it may not be done so). Also in the case of synchronous reception, like synchronous transmission, radio frame sync should be established, which means that downlink of CoMP cell should be aligned, a delay difference between uplink signals received in CoMP cell should be smaller than a CP length, and the advance amount should be large enough to avoid inter-lock interference. Secondly, PRB allocation in PUSCH for uplink should be the same. Finally, like in the case of downlink, content corresponding to each PRB should be the same. Since a transmission point on uplink is user equipment, the content sync may be spontaneously satisfied.

A mobility management scheme is suggested herein to enhance mobility by applying CoMP to Inter-(C)BS or Intra-(C)BS. Additionally, X2 which is conceptually sidehaul is mentioned herein, but it may be designed as backhaul, so that a message may be split into two. For example, for an anchor cell modify request X2 message to be designed with backhaul interface, it should go through MME, and thus, it may be split into anchor cell modify request (uplink) and anchor cell modify request (downlink). With such a sidehaul interface deemed an internal message, it may be applicable to CoMP that is Intra-(C)BS in concept (including both the inside of cell in the cloud base station and the inside of the existing base station).

Figure 7:
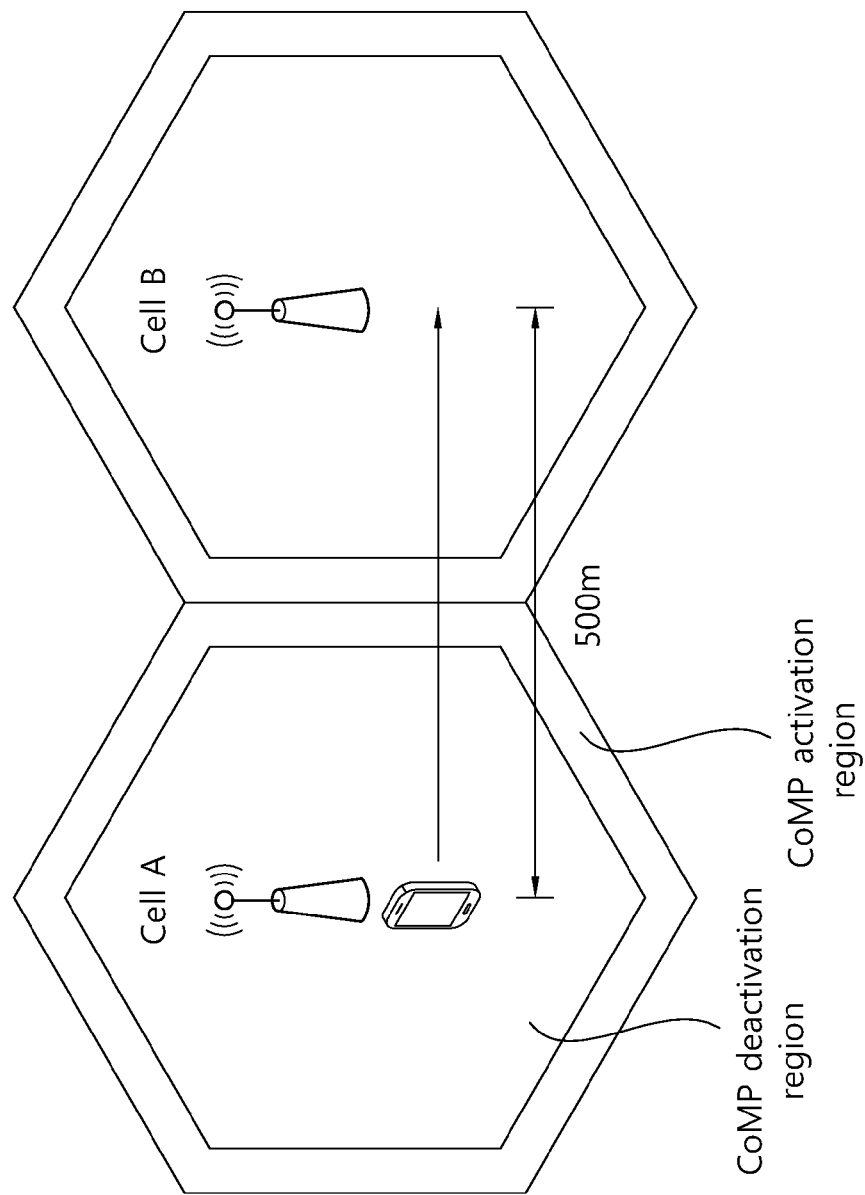
FIG. 7 is a view illustrating initiating and stopping CoMP upon shift from cell A to cell B in a coordinated multi-point transmission and reception method according to an embodiment of the present invention.

FIG. 7 is a view illustrating initiating and terminating CoMP upon shift from cell A to cell B in a coordinated multi-point transmission and reception method between two cell-planned cells (i.e., non-overlaid cell environment).

Figure 8:
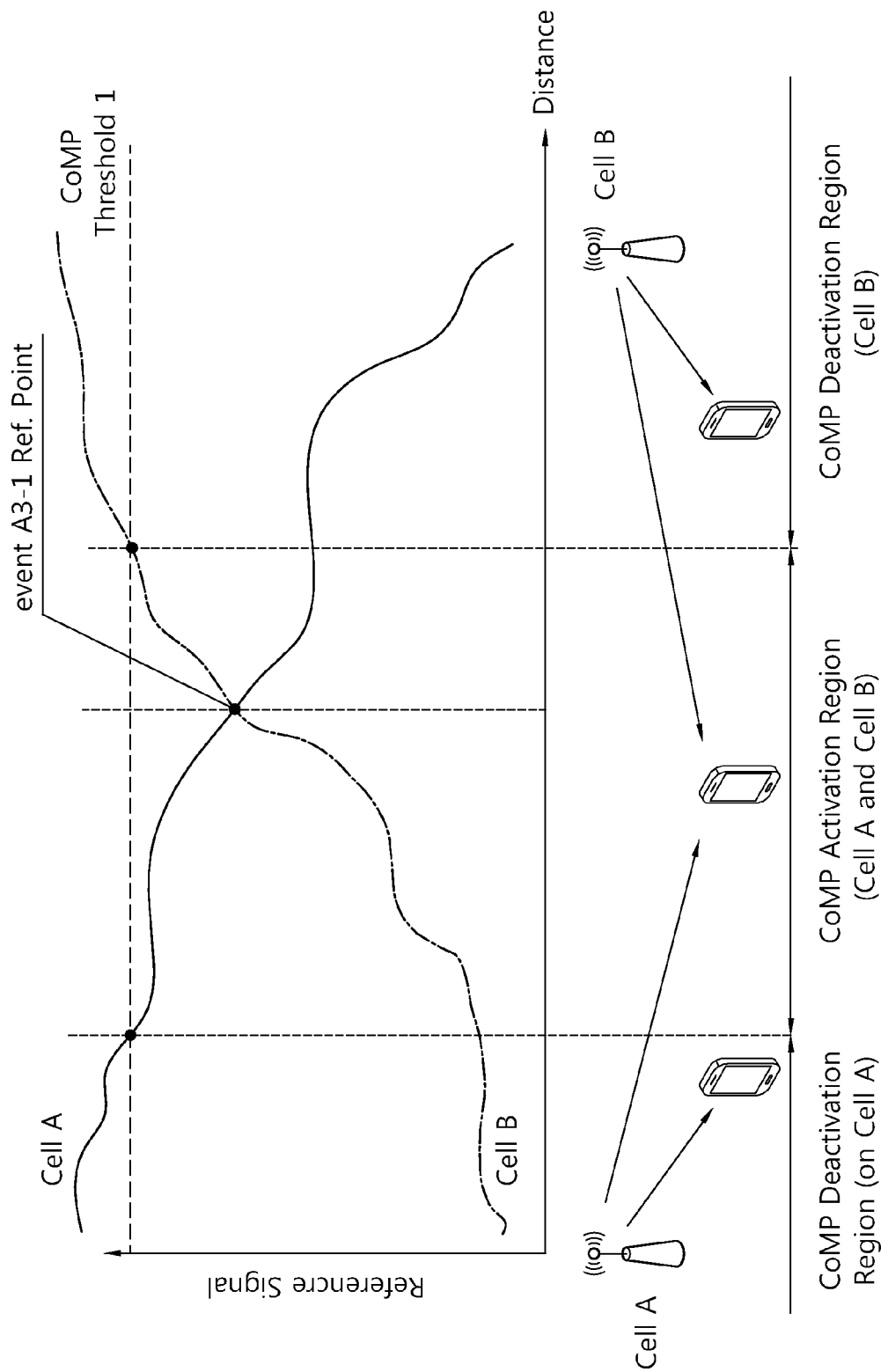
FIG. 8 is a view illustrating determining whether to terminate CoMP operation based on a signal from a serving cell and CoMP threshold value of 1.

Referring to FIG. 7, it is assumed that upon shift from cell A to cell B, such shift is in progress from CoMP deactivation region of cell A through activation region of cell A and then CoMP activation region of cell B to CoMP deactivation region of cell B. FIG. 8 shows changes in RSRP (Reference Signal Received Power) of two cells (Cell A and Cell B) in accordance with the shift. As is away from cell A, RS of cell A reduces, and as is closer to cell B, RS of cell B increases.

Hereinafter, a CoMP coordinated set determining method is described according to an embodiment of the present invention.

According to an embodiment of the present invention, a determination on cells attending a CoMP coordinated set may be made based on RSRP (or RSRQ (Reference Signal Received Quality)). RSRP corresponds to SNR, and RSRQ corresponds to SINR. This is based on a measurement report (MR) coming up through a measurement configuration of RRC (Radio Resource Control). The measurement configuration may use an event scheme and a periodic scheme. In the event scheme, UE determines an event based on a condition received from BS, and in the periodic scheme, base station determines an event. By using either scheme, a method of determining CoMP coordinated set by MR of RRC may be summarized into the following three.

First, a reference of serving cell is determined to determine the CoMP coordinated set.

FIG. 8 is a view illustrating determining whether to terminate CoMP operation based on a signal from a serving cell and CoMP threshold value of 1.

Referring to FIG. 8, if the signal of the serving cell is smaller than the CoMP threshold value, 1, (CoMP Threshold 1) based on CoMP threshold value, 1, (CoMP Threshold 1) that is a reference of the serving cell, CoMP operation begins (CoMP deactivation region→CoMP activation region).

(1) In Case the Number of CoMP Cells is 2 (T2=0)

In case the number of CoMP cells is 2, the CoMP coordinated set may be one of the serving cell and neighboring cells, which has the highest signal strength.

(2) In Case the Number of CoMP Cells is 3 (T2=a, where a is a Positive Integer)

In case the number of CoMP cells is 3, a cell having the highest signal strength among neighboring cells and a cell (e.g., a neighboring cell having the highest signal strength among the remaining neighboring cells) having a signal that is larger in strength than a signal having a strength by a than the signal strength of the neighboring cell having the highest signal strength may be included in the CoMP coordinated set. That is, if there are neighboring cells satisfying condition T2, the CoMP coordinated set may include three cells such as the serving cell, a neighboring cell having the highest signal, and a neighboring cell having the second highest signal and satisfying condition T2.

According to an embodiment of the present invention, if a signal of the serving cell or neighboring cell is larger than CoMP threshold value, 1, the CoMP operation stops (CoMP activation region→CoMP deactivation region).

At this time, if the signal of the serving cell is lower in strength than the CoMP threshold value, 1, as an event to support an event scheme for determining a serving cell reference value, such an event as informing the signal strength of the neighboring cell having the highest signal strength, raising the signal strength of the neighboring cell satisfying condition T2, or raising the signal strengths of the neighboring cells in descending order.

Next, a neighboring cell-based determination may be performed as follows.

Figure 9:
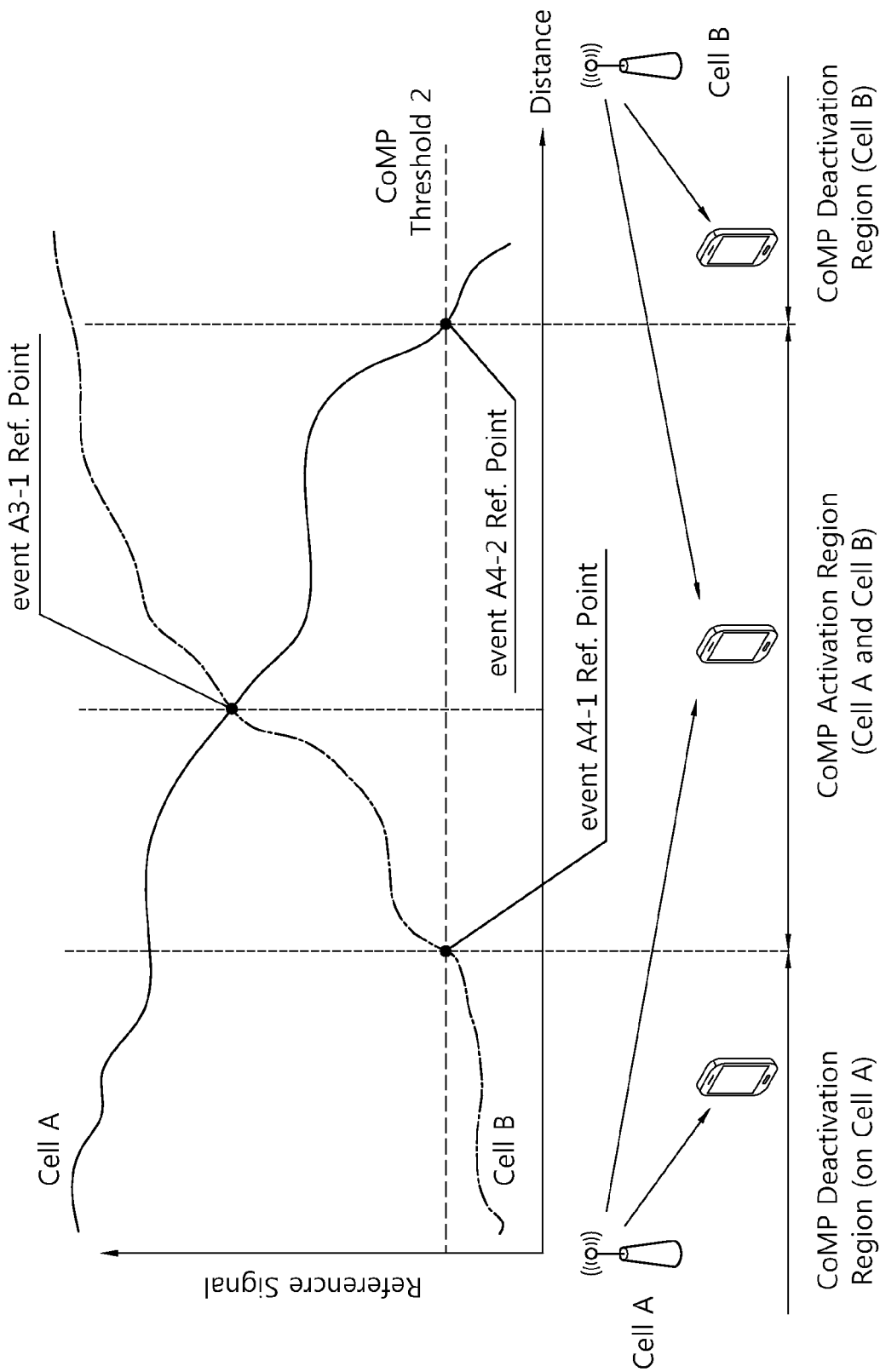
FIG. 9 is a view illustrating determining whether to stop CoMP operation based on a signal of a neighboring cell and CoMP threshold value, 2.

FIG. 9 is a view illustrating determining whether to stop CoMP operation based on a signal of a neighboring cell and CoMP threshold value, 2.

Referring to FIG. 9, if a neighboring cell having no RRC connection with respect to the signal of the neighboring cell has a signal strength that is higher than CoMP threshold value, 2, the serving cell and neighboring cell(s) having a signal strength that is higher than CoMP threshold value, 2, may be put in the CoMP coordinated set. If there is no neighboring cell having a signal strength that is higher CoMP threshold value, 2, CoMP does not operate. Further, as described above, if the signal of the serving cell is higher in strength than CoMP threshold value, 1, CoMP does not operate.

According to another embodiment of the present invention, when a difference in signal strength between the serving cell and the neighboring cell is a predetermined value or less, CoMP may be initiated or stopped. That is, in case the difference in signal strength between the serving cell and the neighboring cell is a specific threshold value or less, CoMP may be started or paused.

Figure 12:
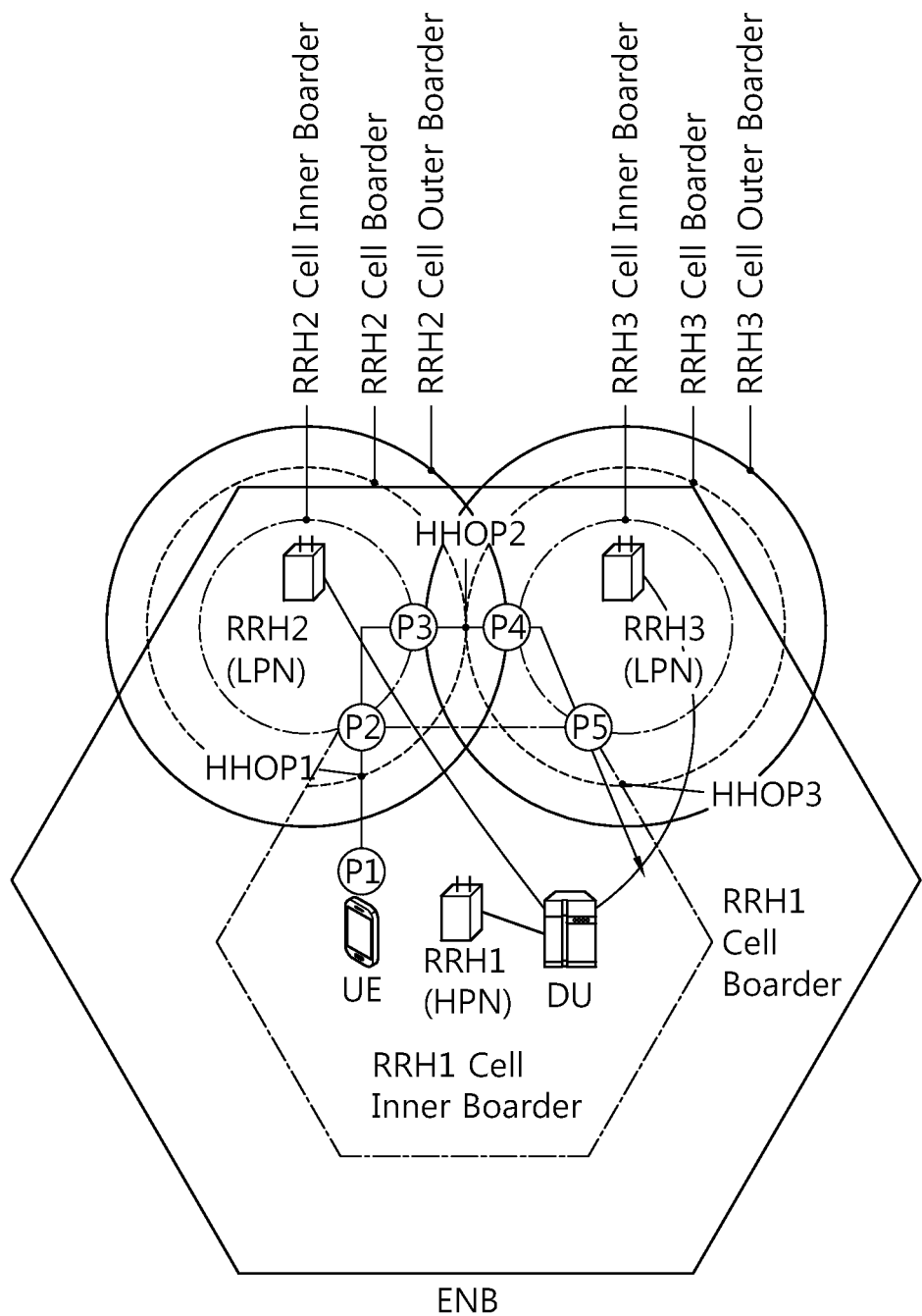
FIG. 12 is a view illustrating a location-based CoMP procedure in a coordinated multi-point transmission and reception method according to another embodiment of the present invention.

Further, according to still another embodiment of the present invention, RS for each serving antenna port may be configured UE-specifically to determine to initiate or stop CoMP. In other words, in the overlaid cell environment as shown in FIG. 12, not non-overlaid cell environment as shown in FIG. 7, it is difficult to determine to initiate and stop CoMP by CRS (cell-specific reference signals)-based RSRP/RSRQ measurement, and thus, antenna port-based UE-specific RS is configured (in light of RS start position and period) so that UE may measure it and may utilize it for CoMP-related operation.

According to an embodiment of the present invention, CoMP may be performed by using a combined determination scheme. For example, CoMP threshold 1 and 2 conditions are both imposed, so that if the signal strength of the serving cell is lower than CoMP Threshold 1, CoMP is considered but if there is no neighboring cell satisfying the condition that the signal strength is higher than CoMP Threshold 2, only the serving cell is present in the CoMP coordinated set. That is, the above-mentioned method of determining serving cell and neighboring cell and method of configuring RS for each antenna port may be combined with each other depending on the situation.

At this time, determination of CoMP Threshold 1 and 2 may be made in various ways depending on cell layout and schemes. In light of cell layout, CoMP Threshold 1 may be determined as a value that may increase system capacity and coverage by the serving cell performing CoMP, and CoMP Threshold 2 may be determined as a value that is a minimum signal strength of the neighboring cell, which enables any effects to be shown from CoMP. Such values may be set to be common to all CoMP schemes or a different value may be configured and operated for each of JT/JR, DPS, CS/CB, and other schemes.

According to an embodiment of the present invention, it is assumed that such values may be adjusted in accordance with speed of UE. If UE travels at high speed, the values are adjusted so that a broad CoMP activation region is secured, and if UE travels at low speed, the CoMP activation region is adjusted to be consistent with an available handover (HO) region as possible so as to reduce a change in the anchor cell. Here, the anchor cell means a cell that performs PDCCH/RRC signaling.

MAC-to-MAC signaling is hereinafter described.

As described above, CoMP coordinated set and feedback method may be determined by RRC signaling. Further, in some cases, CoMP scheme and feedback may be determined within an operating range by the RRC signaling while adapted to an instant change in channel by MAC-to-MAC signaling. Otherwise, RRC determines CoMP activation/deactivation in such a manner that CoMP-related matters, in light of long term with two-layer determination structure, are determined by RRC, and connection information on the corresponding CoMP UE is provided by RRC, and determination of the CoMP anchor cell depending on an instant change is performed using MAC-to-MAC signaling, and a change in the anchor cell may be notified to RRC. For example, in the Inter-(C)BS structure, as shown in FIGS. 8 and 9, determination on CoMP activation/deactivation is made by RRC, and determination of CoMP scheme and feedback scheme in the CoMP activation region is carried out through MAC-to-MAC signaling so that CoMP may apply under the Intra-(C)BS circumstance.

Figure 10:
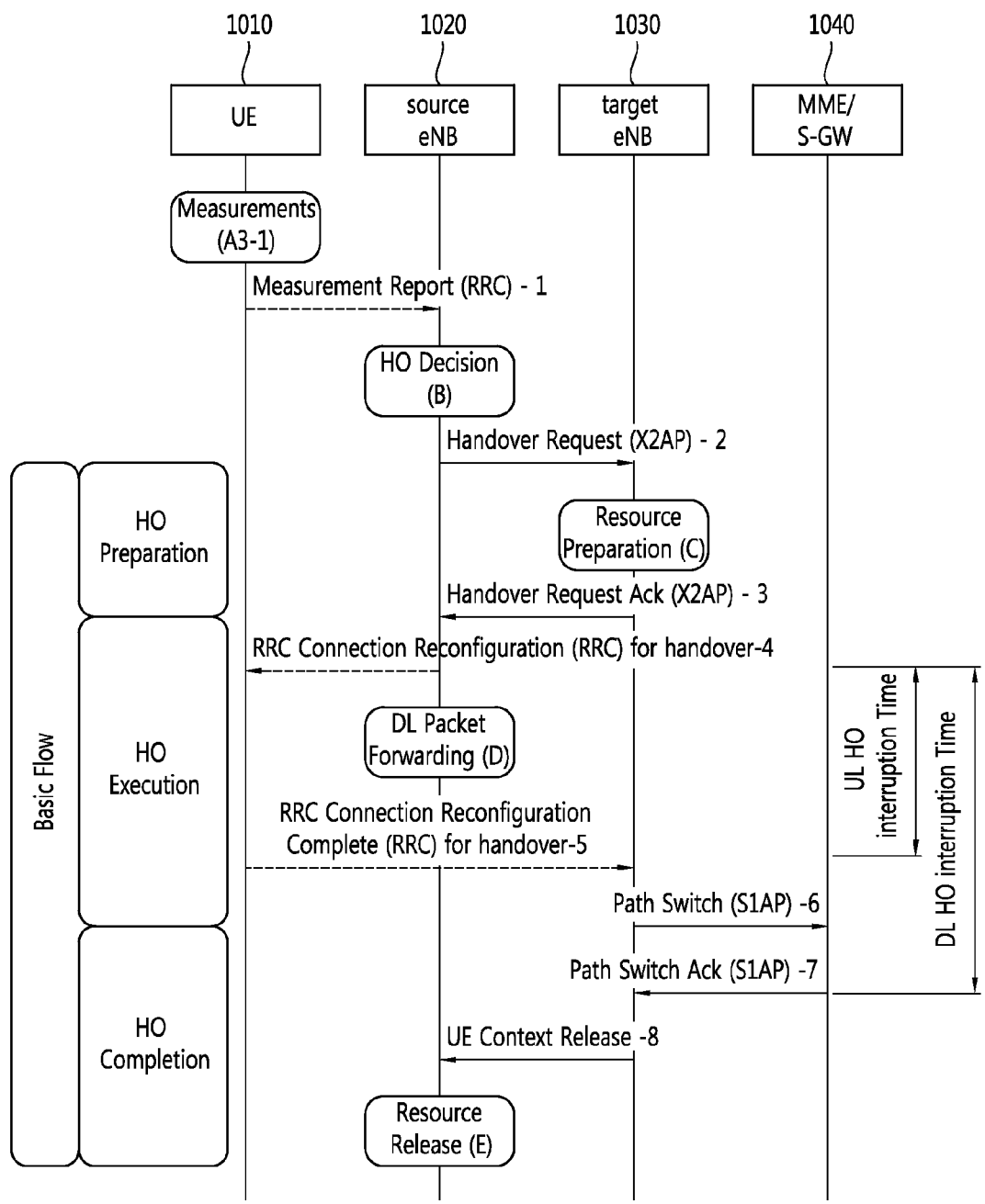
FIG. 10 is a flowchart illustrating a conventional handover procedure.

FIG. 10 is a flowchart illustrating a conventional handover procedure.

Referring to FIG. 10, the conventional handover procedure may consist of three steps of HO (HandOver) preparation, HO execution, and HO completion. If handover is attempted by an event at the boundary between two cells, handover is done at a point where the A3-1 event (e.g., TimeteToTrigger=0, Hysteresis=0) occurs as shown in FIG. 7 so that the serving cell shifts from cell A to cell B. That is, in the conventional handover procedure, with message No. 4, the UE 1010 has been previously connected to cell A only, and after the message No. 5, the UE 1010 is left connected to only cell B, and a time happens during which data drops between message No. 4 and message No. 5. In other words, according to the conventional handover procedure, a serving cell where data descends, a serving cell where RRC signaling is done, and a serving cell where PDCCH is signaled are any one cell at one point.

However, in case uplink and downlink CoMP transmission and reception are performed, as shown in FIG. 7, a CoMP region is configured at the boundary between cell A and cell B, and downlink CoMP JT is implemented at the cell A and cell B transmit ends in this region, and uplink CoMP JR may be done that comes from the UE 1010. That is, the UE 1010 is connected to cell B as well as cell A, and in the case of DSP, transmission and reception points may be varied on a per-subframe basis. Accordingly, a procedure may not be needed of dropping message No. 4 shown in FIG. 10 at the source eNB 1020 and receiving the message No. 5 at the target eNB 1030 (the conventional handover procedure may, as is, apply to CS/CB, and JT/JR and DPS may not need the conventional hard handover procedure). Resultantly, only a procedure of changing the anchor cell may be carried out.

Figure 11:
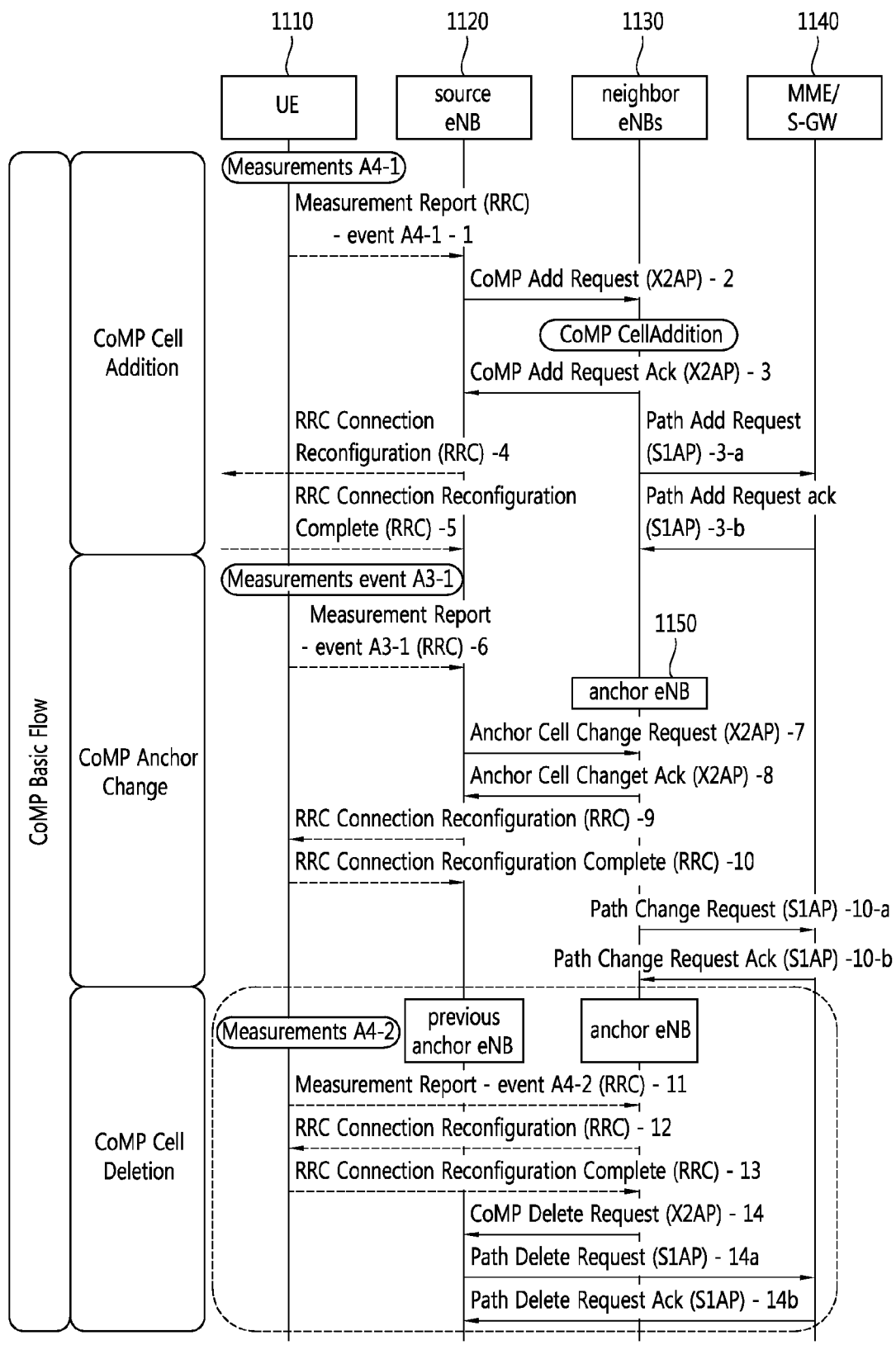
FIG. 11 is a flowchart illustrating a coordinated multi-point transmission and reception handover method according to an embodiment of the present invention.

FIG. 11 is a flowchart illustrating a coordinated multi-point transmission and reception handover method according to an embodiment of the present invention.

Although the CoMP coordinated set determining method mentioned herein is based on what is shown in FIG. 9, various types of CoMP coordinated set determining methods as mentioned above may apply. Referring to FIG. 11, X2 message may be considered an internal message of Intra-BS. As described above, in the case of Intra-BS, the anchor cell may be changed through Mac-to-Mac signaling.

The coordinated multi-point transmission and reception handover method according to an embodiment of the present invention may include a process in which a serving cell base station performs requesting and accepting coordinated multi-point transmission and reception with a base station having a signal that is larger in strength than CoMP threshold value 2 to add coordinated multi-point related base station (CoMP Cell Addition step), a process in which the serving cell base station performs anchor cell modify requesting and accepting with a neighboring cell having a signal that is larger in strength than its signal (CoMP Anchor Change step) and a step in which the changed anchor cell base station, in case a signal of the existing anchor cell base station is smaller in strength than CoMP threshold value 2, deletes the coordinated multi-point-related base station by requesting that the existing serving cell base station delete the coordinated multi-point (CoMP Cell Deletion step).

(1) CoMP Cell Addition Process

First, the UE 1110 sends a measurement report (MR) (RRC) to the source eNB 1120 through RRC signaling (1). Assume that in the measurement report A4-1 event with increased CoMP Threshold 2 has been configured for a neighboring cell among meas Id-Reporting Id-Object Id through a measurement control configuration. At this time, A4-1 event for specific neighboring cell B may come up.

The source eNB 1120 transmits CoMP add request to the neighboring eNB 1130 through X2AP (2). Here, the neighboring eNB 1130 may be an eNB that transmits a signal that is larger in strength than CoMP Threshold 2. In the CoMP add request message, any one scheme (JT/JR, DPS, CS/CB) of each of uplink CoMP and/or downlink CoMP and time of applying (for example, SFN into activation time) are determined, and necessary information (e.g., cell ID, antenna port and CRS information) regarding related parameters and CoMP-related current anchor cell may be included.

Next, the neighboring eNB 1130 adds a CoMP cell and transmits an ACK (CoMP Add Request Ack) for CoMP add request to the source eNB 1120 (3). That is, the neighboring eNB 1130 receives the CoMP add request and accepts the CoMP scheme based on the information included in the request and provides its CoMP-related cell information. Here, access information (T-b1, T-b2, related Transport Layer Address) for reception forwarding to base station cell B may be included. If this process is normally treated, the CoMP coordinated set becomes cell A and cell B.

After cell B is added to the coordinated set, the neighboring eNB 1130 transmits and receives path add request/ACK messages to/from the MME/S-GW 1140 through S1AP (3-a, 3-b). In 3-a, downlink access information (T-b3 and Transport Layer Address) of the base station to receive downlink from S-GW is provided to S-GW through MME. In some cases, uplink access information (T-g1) of S-GW used in base station A may be provided. Further, in 3-b, S-GW may determine whether to use T-g1 with Transport Layer Address changed or whether to change T-g1. In the drawings, T-g1 is used as is, but it is not necessary to use it as is. Resultantly, uplink access information and downlink access information may be exchanged through the 3-a and 3-b procedures.

In the JT and DPS schemes, the existing downlink access information (T-a1) and the newly added downlink access information (T-b3) may be simultaneously made down through downlink traffic (at this time, absolute time information may be included in the downlink packets for synchronization). Or, after receiving message No. 3, DL traffic getting through T-a1 may be rendered down based on the received information, and site forwarding may be done even with T-b1. As necessary, uplink traffic may also be sent through T-g1 while simultaneously able to be sent through T-b2 (at this time, time information may be included to establish sync on the traffic forwarded through T-b1 and T-b2).

The source eNB 1120, after receiving the CoMP add request accept message, may transmit and receive an RRC connection reconfiguration/complete message to/from the user equipment 1110 through RRC signaling (4,5). In message No. 4 may be included the feedback type of the user equipment 1110 (CQI/RI/PMI are reported totally with cell A and cell B, i.e., request that the feedback of one cell be put together with the feedback of other cells including the cell).

In other words, if A4-1 event occurs (signal from neighboring cell>CoMP Threshold 2), the cell of the neighboring eNB 1130, which has triggered the A4-1 event, is added through message No. 2 and message No. 3 for CoMP. The anchor cell 1120 that remains strong in signal strength provides information of the CoMP non-anchor cell to the user equipment 1110 (message No. 4 and message No. 5). By performing such procedures, two-cell CoMP may operate that performs two-cell transmission and two-cell reception between the user equipment 1110, the current anchor cell 1120, and added anchor cell 1130. Here, if A4-1 event additionally occurs in the cell of another eNB, the CoMP cell is added to the source eNB 1120 and the UE 1110 in procedures No. 2, No. 3, and No. 5. In such case, the source eNB 1120 should inform that in addition to the previously added cells, the total number of CoMP cells is 3 by sending it to the previously added cells through message No. 2 and message No. 3 and should let the newly added cell know that a total of three cells are doing CoMP operation by providing information on the current anchor cell and previously added cells to the newly added cell. At this time, a method of receiving downlink traffic in the anchor cell and providing it to other CoMP cells may be used or downlink packets may be multicast through S-GW. In the latter case, S-GW should conduct a procedure for enabling multicasting (procedures 3-a and 3-b).

(2) CoMP Anchor Change Step

In this step, the UE 1110 first does measurement report (MR) (RRC) to the source eNB 1120 through RRC signaling (6). The measurement report assumes that an A3-1 event is set in which among meas Id-Reporting Id-Object Id, the signal strength of neighboring cell is larger than the signal strength of the current anchor cell through measurement control configuration. At this time, the A3-1 event for a specific neighboring cell B may come up.

Next, the source eNB 1120 transmits an anchor cell modify request to a neighboring eNB 1150, through X2AP, which is larger in signal strength than the current anchor cell (7). That is, the anchor cell change message is transmitted to the base station (eNB) to which cell B belongs of having triggered the A3-1 event. With CoMP information related to the anchor CoMP set including the anchor cell contained, anchor cell change and time of applying thereof (e.g., SFN) are requested. The source eNB 1120 may selectively include, in the request message, uplink and downlink forwarding access information (T-a2, T-a3) to be received from base station cell B to base station cell A.

The neighboring eNB 1150 (base station to which cell B belongs) receives the anchor cell change message and determines whether to accept or decline the anchor cell modify request sent from the base station to which cell A belongs and based on this transmits an ACK for the anchor cell change message through X2AP (8).

If the request is accepted, the source eNB 1120 transmits and receives RRC connection reconfiguration and complete messages to/from the user equipment 1110 through RRC signaling (9, 10). The RRC connection reconfiguration message may contain information for informing the anchor cell change and reconfiguring the feedback configuration of the user equipment. By normally processing the message, cell A and cell B, members of the CoMP coordinated set, have the relationship varied (cell A turns from anchor cell into non-anchor cell, and cell B turns from non-anchor cell into anchor cell).

While message No. 9 is transmitted from base station cell A, the downlink traffic coming down through T-a1 is simultaneously forwarded to T-b1, and some of the uplink traffic is forwarded through T-b2, thus ending up being transmitted to S-GW through T-g1. While the user equipment 1110 brings b up, the uplink traffic is simultaneously transmitted wirelessly to S-GW through base station cell B and T-g1, and the downlink traffic received via T-a1 and T-b1 may be down from base station cell B to the user equipment 1110.

If the process is complete, the changed neighboring eNB 1150 transmits and receives a path change accept/decline message to/from an MME/S-GW 1140 through S1 AP (10-a, 10-b). Here, in the case of CS/CB, it may be requested to switch from T-a1 to T-b3 through message No. 10-a (path modify request) so that the downlink traffic comes down through T-b3.

(3) CoMP Cell Deletion Step

In this step, the UE 1110 does first measurement report (MR) (RRC) to the changed neighboring eNB 1150 through RRC signaling (11). The measurement report assumes that for a neighboring cell among meas Id-Reporting Id-Object Id, an A4-2 event is configured of having a smaller value than CoMP Threshold 2 through measurement control configuration. At this time, the A4-2 event for a specific neighboring cell A may come up.

The changed neighboring eNB 1150 transmits and receives an RRC connection reconfiguration/complete message to/from the user equipment 1110 through RRC signaling (12, 13). Here, message No. 12 (RRC connection reconfiguration message) may include information on CoMP deactivation and feedback information of the user equipment 1110.

The changed neighboring eNB 1150 transmits a CoMP delete request to the existing anchor eNB 1120 through X2AP (14). That is, this message is sent to the base station (eNB) to which cell A that has triggered the A4-2 event belongs. The base station 1120 receives the CoMP delete request message and deletes all information relating to the corresponding user equipment 1110 including CoMP (e.g., T-b1, T-b2, T-a2, T-a3, etc.).

Finally, the changed neighboring eNB 1150 transmits and receives a path delete request/accept message to the MME/S-GW 1140 through S1 AP (14-a, 14-b). The MME/S-GW 1140 deletes all the uplink/downlink access information (T-a1, T-g1) with S-GW and base station cell A through the path delete request/accept message.

The basic information that should be included in each message in the procedure illustrated in FIG. 11 is as follows.

[Radio Interface] RRCConnectionReconfiguration/Complete

1. CoMP Cell List (Cell Information, enum (anchor, non-anchor), operation (add/modify/delete)) & feedback information (CQI,PMI,RI—all or specific cell(s) or anchor cell only). Here, Cell Information provides UE feedback type and information on CoMP cell added through dedicated signaling on the handover cell information provided upon existing handover.

2. in procedure No. 4 illustrated in FIG. 11, information such as Cell Information added to CoMP cell, non-anchor, operation (add) may be added.

3. in procedure No. 9 illustrated in FIG. 11, Cell Information on anchor cell, anchor, action (modify) information may be included. At this time, Cell Information provides only as much information as the cell may be specifically identified, but not all information.

4. in procedure No. 12 illustrated in FIG. 11, Cell Information for cell to be excluded from CoMP operation, non-anchor, and operation (delete) information are included. At this time, Cell Information provides only as much information as the cell may be specifically identified, but not all information.

[X2 Interface]

1. Anchor Cell Add Request/Response

To perform operation on CoMP cell to be added, Anchor Cell information is provided to the non-anchor Cell to be added, and on the contrary, information on the non-anchor cell to be added is fetched by the anchor cell. Such information exchange is for purposes of CoMP transmission and reception and the obtained anchor cell information is provided to UE through message No. 4.

2. Anchor Cell Modify Request/Response

This is to change anchor cell in CoMP cell. Here, the information includes information informing that "you are an anchor cell" and information on whether a cell receiving the message is to accept it. If accepted, the information on the anchor cell having been changed is transferred from the previous non-anchor cell through the no. 9.

3. CoMP Delete Request

This is a message for stopping CoMP transmission/reception operation of the non-anchor CoMP cell. UE Context Release or a new message (CoMP Delete Request) may be designed. To utilize the existing message, CoMP Cell Identity may be added. If there is no CoMP Cell Identity, the process may be done as meant in the existing message. Accordingly, if CoMP Cell Identity exists, CoMP Cell Identity is managed by itself, and if it is managed by itself, an operation for stopping CoMP operation may be conducted. On the contrary, if it is not managed but remains in CoMP Relation, it may be updated that the corresponding CoMP cell has been excluded from CoMP operation.

[S1 Interface]

1. Path Add Request/Ack

TE ID for packets transmitted and received between S-GW and eNB and Transport Layer Address are exchanged.

2. Path Modify Request/Ack

Information on eNB having been changed to another node in the control plane configuration between MME and eNB is informed, and Association is established between the changed eNB and MME.

3. Path Delete Request/Ack

Transport Layer Address and TE-ID related to user plane with S-GW corresponding to cell removed from CoMP are deleted.

At this time, upon exchange of user plane traffic packets between S-GW and eNB, a multicast protocol may be internally used to exchange the related information.

If CS/CB is performed based on the CoMP operating procedure shown in FIG. 11, it may be done through coordination between CoMP cells, and necessary information may be included in the LOAD INFORMATION message and may be used. And, switching by the Anchor Cell Change operation illustrated in FIG. 11 may be performed, or rather than the Anchor Cell Change procedure shown in FIG. 11, Anchor Cell Change may be conducted using the conventional handover procedure shown in FIG. 10.

If DPS is performed based on the CoMP operating procedure shown in FIG. 11, it may be done through the Anchor Cell Change/Response message and messages Nos. 9 and 10.

If JT/JR is performed based on the CoMP operating procedure shown in FIG. 11, additional information exchange as shown below may be needed. Basically, since JT/JR is impossible to perform in real time through X2-based coordination, it cannot help being implemented by a Semi-static Coordination method.

In other words, bearers are possessed by one UE, and considering the bearers, the maximum transmit rate may be sufficiently secured. In the case of uplink or downlink HARQ, it is in principle performed only in the anchor cell. In case the current serving cell adds a CoMP cell and thus becomes an anchor cell, the anchor cell provides frequency information and allocation pattern for subframes for a predetermined time and provides an Activation Time (e.g., SFN). For example, although a CoMP is actually added, a CoMP operation for non-Anchor is initiated at the Activation Time. Such information may be summarized as follows.

[About UL and DL]

1. Activation Time: SFN (0-4095) when CoMP is initiated based on anchor

2. Subframe Pattern: time bitmap for some constant time. For example, if it is 100 ms, with respect to 100 bitmaps, if 1 for each bit, the subframe is assigned resource, if 0, the subframe is excluded from being assigned resource (for Reference Point, Activation Time becomes a reference and may repeat)

3. Frequency Band: system band is displayed with bitmap on frequency axis. If 1, it is assigned to the frequency, if 0, it is not assigned to the frequency. Or, frequency hopping map may be provided.

The above three types of information are basically included in CoMP Add Request and CoMP Cell Modify request, and as UE QoS is en route changed, a UE CoMP Modification Request/Response message may be defined from Anchor Cell to another CoMP cell so that a joint allocation region for JT/JR may be defined in the CoMP cell. At last, a time in the cell, when CoMP is likewise applied through Activation Time, may be provided, thus able to realize non-real time JT/JR, but not real time.

With the above information, PDSCH and PUSCH resource regions for CoMP JT and CoMP JR are brought up between CoMP cells in the same manner. When there are many resources as compared with transmission packets, padding is performed before sent. And, DL HARQ and UL HARQ are performed only by anchor CoMP cell, while non-anchor CoMP cell disables HARQ function. And, UL and DL resource allocation of HARQ in the anchor CoMP cell is transmitted only to an area that is not the above defined resource region. That is, resources are allocated in the part defined by the above three parameters in all CoMP cells, and re-transmission by ACK and NACK for HARQ is achieved only in the anchor CoMP cell. Non-anchor CoMP cell may disable HARQ functions.

FIG. 12 is a view illustrating a location-based CoMP procedure in a coordinated multi-point transmission and reception method according to another embodiment of the present invention. Here, the "location-based" may refer to an actual location estimated value considering other various actual devices, but the location-based herein means a point for triggering a CoMP procedure based on a signal measured by UE.

Referring to FIG. 12, user equipment may perform CoMP while moving between a plurality of cells in heterogeneous networks. Here, the heterogeneous network is a network where base stations e having different layers from each other exist and may be a network where macro cells and pico cells or femto cells co-exist. RRH1 refers to RRH of a base station managing HPN (High Power Node). RRH1 cell may be a macro cell and may include RRH 2 and RRH 3 cells. The RRH1 base station is a cloud base station and may include a DU (Digital Unit). RRH2 and RRH3 are RRHs of cells adjacent to each other, and RRH2 cell and RRH3 cell, as LPN (Low Power Node), may be a pico or femto cell. According to an embodiment of the present invention, UE sequentially moves from P1 through P2, P3, and P4 to P5. Further, assume TJ/JR-type CoMP.

By applying CoMP to mid/high speed UE as well as stationary/low speed UE in a new mobile communication environment such as CBS (cloud base station) and overlaid cell environment, rather than applying CoMP to a boundary between cells having a homogenous coverage layer, signal quality and mobility (reduced Late HO, Early HO, Wrong Cell HO, Ping-pong) may be enhanced.

FIG. 13 is a view illustrating per-expanded RS-based user equipment RS allocation and measurement in a coordinated multi-point transmission and reception method according to another embodiment of the present invention.

Referring to FIG. 13, in the coordinated multi-point transmission and reception method according to the present invention, a cell base station allocates, without collision, per-cell CSI-RS (Channel State Indicator-Reference Signal) related RS RE (Reference Signal Resource Element) for LPN cell such as RRH2 and RRH3 and HPN such as RRH1. The base station scheduler may allocate CRS ports 0 to 3 to RE corresponding to third, sixth, ninth, and twelfth columns of PDCCH in one PRB (Physical Resource Block) and first and second rows of the columns. Further, the base station scheduler may allocate CRS ports 0 to 7 to RE corresponding to third, fourth, ninth, and tenth columns of PRB and sixth and seventh rows. At this time, multiplexing may be done in pair.

The base station scheduler allocates a PRB to corresponding user equipment and to a corresponding subframe in the above-described manner.

The user equipment may extract RE related to the CSI-RS in the PRB. The user equipment then calculates the entire quality of CSI-RS related REs allocated to the corresponding user equipment per subframe during a constant period. By this calculation, RSRP(Q) channel for Long Term UE Specific RS may be estimated, by which pico cells in the macro cell may be distinguished. Further, Short Term UE Specific Feedback information may be provided (apply Dynamic AMC).

Figure 14B:
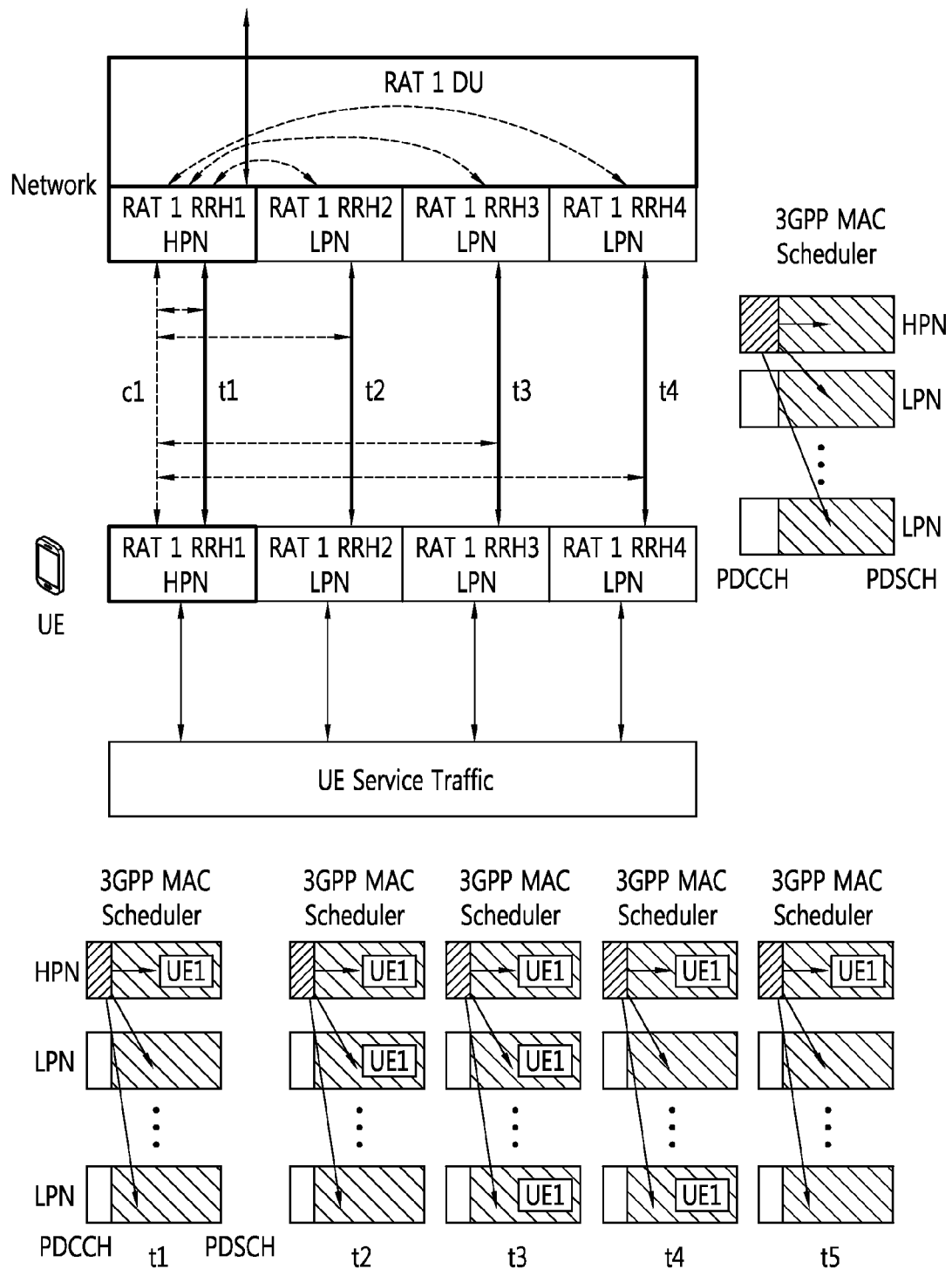

FIGS. 14a and 14b are views illustrating HPN PDCCH anchoring operation for corresponding user equipment in a downlink CoMP scheduling processing method of a coordinated multi-point transmission and reception method according to another embodiment of the present invention.

Referring to FIG. 14a, DU in the macro cell base station should transmit a packet relating to control channel selection and a packet relating to traffic to HPN (macro cell) and LPN (e.g., pico cell or femto cell) base stations to transmit traffic to UE. Accordingly, the HPN base station and the LPN base station transmit traffic to the user equipment through RE allocated to the corresponding user equipment using their respective PDCCHs. However, this is not efficient because the HPN and LPN base stations use their respective PDCCHs although they can use the same control channel.

Referring to FIG. 14b, the DU of the macro cell base station may schedule the LPN base station by anchoring the PDCCH channel of the macro cell base station. That is, allocation of a control channel is performed only on HPN while LPN anchors the PDCCH of HPN for control channel, so that only the PDCCH of HPN alone may be used, thus efficiently providing traffic to the user equipment.

Figure 15:
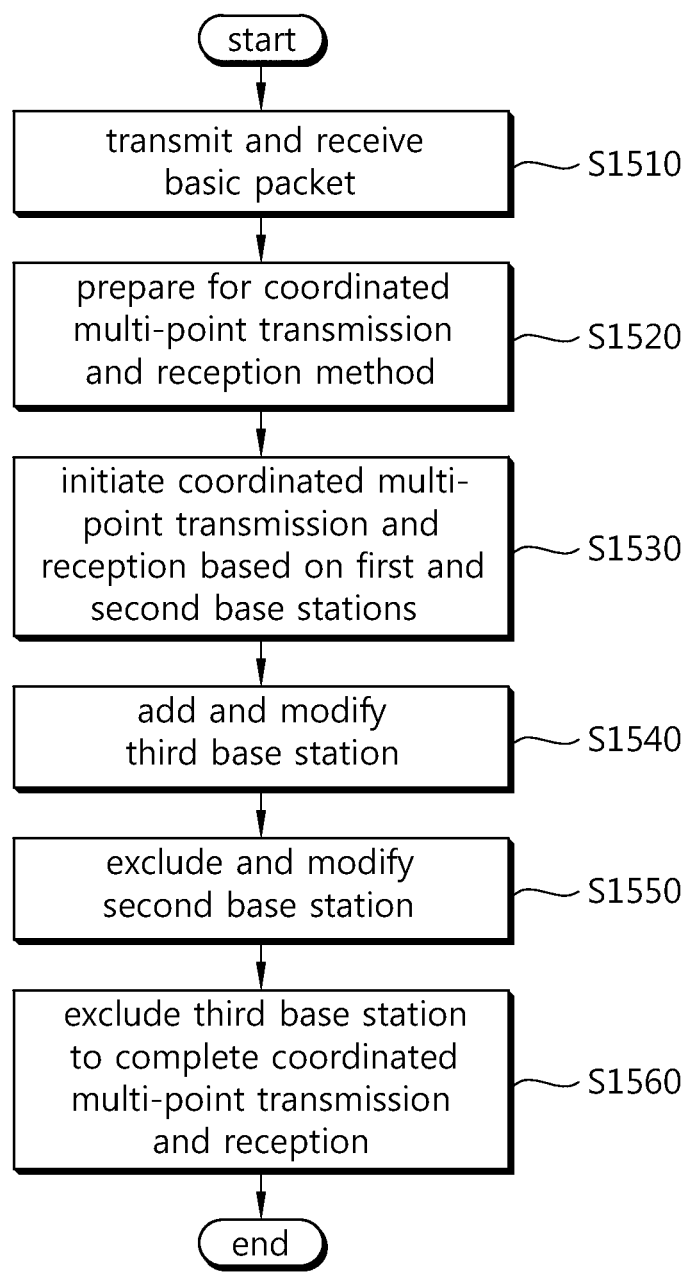
FIG. 15 is a flowchart schematically illustrating a coordinated multi-point transmission and reception method according to another embodiment of the present invention.

FIG. 15 is a flowchart schematically illustrating a coordinated multi-point transmission and reception method according to another embodiment of the present invention.

Figure 16:
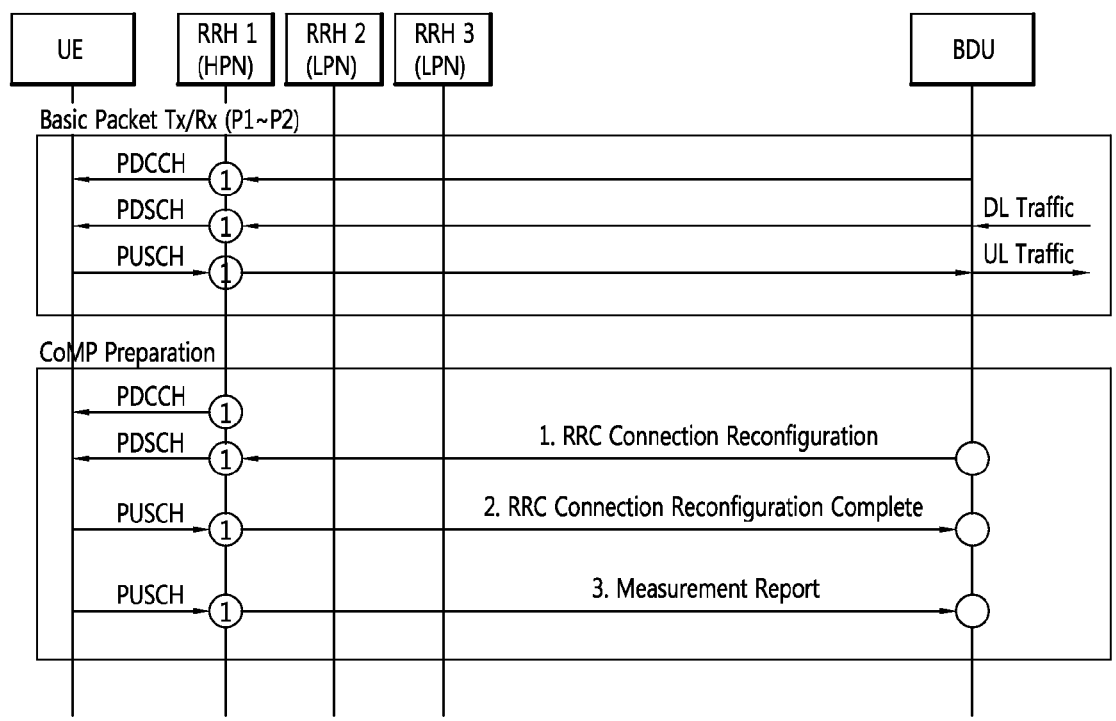
FIG. 16 is a detailed flowchart specifically illustrating a CoMP preparation procedure prepared so that CoMP service may be done in a cell arrangement.

Referring to FIG. 15, in a coordinated multi-point transmission and reception system, a first base station (base station covering RRH 1) transmits and receives basic packets (S1510). This may be performed in the cell arrangement shown in FIG. 12 and in the section where no CoMP scheme applies between P1 and P2 over a UE moving path. This process is to prepare for CoMP service to be available and should presume a basic packet transmission and reception state. The basic packet transmission and reception state means a state in which the UE is connected to one cell and is receiving services while user traffic is transmitted on uplink and downlink. Such state may be made available through a basic function of a B4G mobile communication system. CoMP preparation (P1) may be conducted at P1 point, and during the course of access process by the basic function, considering CoMP service, a CoMP preparation process may be conducted along with the basic access. Also in such CoMP preparation, related configuration information may be varied as situation is changed. In FIG. 16, an example is shown where after basic packet transmission and reception has been normally done by the basic function in some area (e.g., P1) where CoMP service is unavailable, CoMP preparation procedure is initiated in order to facilitate description of the concept of CoMP service.

Under the presumption of basic packet transmission and reception state, the first base station prepares for coordinated multi-point transmission and reception (S1520). This may be performed through a process of performing measurement information configuration control of UE and transmitting measurement preparation complete to BDU.

If the preparation for coordinated multi-point transmission and reception is finished, coordinated multi-point transmission and reception is initiated based on the first and second base stations (S1530). This process may be conducted while moving along P2 to P3 positions shown in FIG. 12. Here, the second base station may be a base station covering RRH2 cell. That is, the coordinated multi-point transmission and reception initiation step (S1530) is a procedure for initiating CoMP considering RRH1 and RRH2. The measurement report provided by UE is analyzed to determine RRH2 as well as RRH1 in the coordinated multi-point measurement set. When RRH2 is included, the first base station transmits to UE configuration information for per-UE CSI feedback relating to RRH1 and RRH2. UE performs CSI feedback and may perform JT and JR using the feedback.

Then, while coordinated multi-point transmission and reception is performed with the first and second base stations, a third base station may be added and changed (S1540). This process may be done while moving along P3 to P4 positions shown in FIG. 12. The first base station may perform a CoMP changing procedure for RRH3 under the situation where CoMP service is currently initiated in RRH1 and RRH2 based on what is included in the MR (Measurement Report) providing CSI-RS measurement information in the CoMP preparation process, and based on information obtained by performing such procedure, may change the configuration of CSI feedback based on RRCDML CSI configuration changing information for CoMP measurement set (RRH1, RRH2, RRH3). Under the assumption that JP, a sort of CoMP scheme, is conducted, JT and JR may be then carried out.

Next, the second base station may be changed to be excluded from receiving CoMP service in the first, second, and third base stations attending the CoMP service (S1550). This process may be performed while on the move along P4 to P5 positions shown in FIG. 12. This process may determine to exclude RRH2 from RRH1, RRH2, and RRH3 included in the CoMP measurement set by analyzing the measurement information of MR, and based on this, performs CSI feedback, and thereafter, may perform JT and JR based on RRH1 and RRH3.

Lastly, the third base station may be excluded, and the coordinated multi-point transmission and reception may be then ended (S1560). This process may be a process after P5 position. This process excludes RRH3 from RRH1 and RRH3 attending CoMP service to thereby terminate CoMP service, and the process may be done by analyzing the measurement information of MR as well.

FIG. 16 is a detailed flowchart specifically illustrating a CoMP preparation procedure prepared so that CoMP service may be done in a cell arrangement.

Referring to FIG. 16, the CoMP preparation procedure is a process that allows CoMP service to be available in the cell arrangement shown in FIG. 12, and may include a basic packet transmission and reception step and CoMP preparation process. For CoMP service, as shown in an upper box (Basic Packet Tx/Rx (P1~P2)) shown in FIG. 16, basic packet transmission/reception state should be presumed. The basic packet transmission/reception state shown in the upper part of FIG. 16 means that UE is connected to one cell and is receiving service with user traffic transmitted on uplink and downlink. Such state may be achieved by a basic function of a B4G mobile communication system. At P1 point, CoMP Preparation (P1) may be performed, or taking in consideration CoMP service during the access process performed by the basic function, the CoMP Preparation may be carried out together with the basic access, and such CoMP preparation may also have related configuration information varied as situation changes. For ease of description of CoMP service concept, an example is illustrated in FIG. 16 where after the basic packet transmission/reception has been normally done by the basic function in a specific area (e.g., P1) where no CoMP service is available, the CoMP preparation process is performed. The detailed CoMP preparation procedure is as follows.

[CoMP Preparation—Basic Packet Tx/Rx (P1~P2) Procedure]

Assuming that the cell arrangement shown in FIG. 12 applies and CoMP scheme does not apply between P1 and P2 over the UE's travelling path, downlink and uplink packets may flow through RRH1 using PDSCH (Physical Downlink Shared Channel) and PUSCH (Physical Uplink Shared Channel), respectively, by DL/UL Grant information in CI (Control Information) of PDCCH (Physical Data Control Channel), connected to RRH1 by basic functions.

[CoMP Preparation Procedure—CoMP Preparation (P1)]

1. RRC of the base station performs measurement information configuration control on the UE using an RRC Connection Reconfiguration message. At this time, in light of Long Term Measurement and CoMP Resource Measurement Set management, (non-zero power) CSI-RS resource information and measurement control configuration information thereon are included.

2. UE prepares for measurement according to the measurement control request of RRC message 1, and if the measurement preparation is complete, transmits RRC Connection Reconfiguration Complete to the base station.

3. UE reports measurement report for CSI-RS to the base station through Measurement Report based on the determination reference and reporting type as provided form the base station. The base station manages a subsequent (Feedback) CoMP measurement set based on the measurement report in light of Long Term Measurement and may make determination for triggering CoMP activation/modification/deactivation.

Figure 17:
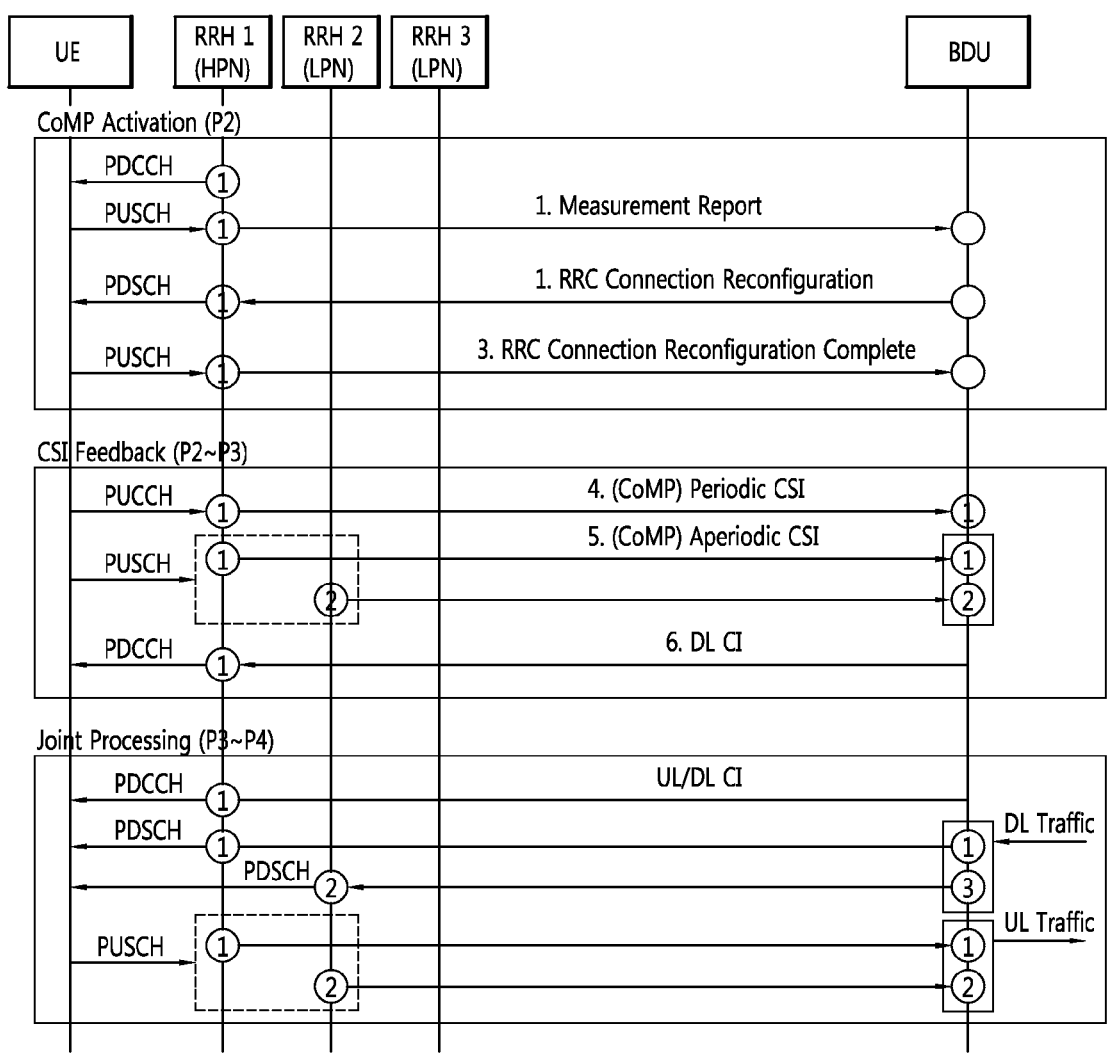
FIG. 17 is a detailed flowchart specifically illustrating a CoMP activation procedure considering RRH2 in addition to RRH1.

FIG. 17 is a detailed flowchart specifically illustrating a CoMP activation procedure considering RRH2 in addition to RRH1.

Referring to FIG. 17, the CoMP activation procedure is considering RRH2 in view of RRH1. Based on what is provided in the measurement report (MR) provided by the UE through the measurement information control on CSI-RS through the CoMP preparation procedure shown in FIG. 17, the base station make determination to thereby perform CoMP Activation (P2) on RRH2, and based on the RRC CSI configuration control information for the CoMP measurement set (RRH1, RRH2) based on the information obtained by performing it, CSI feedback (P2~P3) continues in the section between P2 and P3, and the base station MAC may modify such CSI Feedback configuration through DL CI. Additionally, although various CoMP schemes may apply at P2 point, under the assumption that JP (Joint Processing) has been selected, JT (Joint Transmission) and JR (Joint Reception) on uplink and downlink for RRH1 and RRH2 may be carried out. A detailed CoMP activation procedure is as follows.

[CoMP Activation Procedure—CoMP Activation (P2)]

1. by analyzing measurement information of a measurement report based on the CoMP preparation procedure shown in FIG. 16, the base station determines whether to include RRH2 as well as RRH1 in the CoMP measurement set.

2. If CoMP service is determined to be possible in RRH1 and RRH2 by the base station based on the RRC message obtained from item 1, the base station transmits configuration information for per-UE CSI feedback relating to RRH1 and RRH2 for CoMP service to the UE through an RRC connection reconfiguration message. Here, the per-UE CSI-RS configuration may include a CoMP measurement set configuration for feedback (one or more non-zero CSI-RS resources-related information), CSI-RS configuration for interference measurement (zero power CSI-RS resource information), and per-CSI-RS transmission power configuration information for estimating uplink path loss. The user equipment feedback may include an aperiodic CIS report configuration (aperiodic feedback mode configuration) using PUSCH, configuration of IMR and CSI RS resource that is a target of CSI feedback depending on CSI Request Field value of DCI Format 0 and 4) and periodic CSI report configuration (configuration of IMR and CSI RS that is a target for CSI feedback for each Periodic CSI feedback mode) using PUCCH. As other types of information, PDSCH start symbol (corresponding to JP only), a maximum of three pieces of CRS pattern information as PDSCH RE mapping information (corresponding to JP only), and information relating to configuration of reference signal, Dynamic HARQ-ACK transmission dimensional offset and a change from Cell-specific to UE-specific. At this time, the reference signal configuration information may include downlink PDSCH UE Specific RS (DM-RS) sequence initial value and two VCI values and Base Sequence for uplink PUSCH UE Specific RS (DM-RS) configuration and Cyclic shift hopping information configuration.

3. UE prepares for CSI feedback in response to the CSI feedback configuration request of message No. 2, and if the preparation is complete, transmits an RRC Connection Reconfiguration Complete to the base station.

[CoMP Activation Procedure—CSI Feedback (P2~P3) Procedure]

4. UE performs (CoMP) Periodic CSI feedback on PUCCH for RRH1 and RRH2 in response to the CSI feedback configuration of message No. 2.

5. UE performs (CoMP) Aperiodic CSI feedback on PUSCH for RRH1 and RRH2 in response to the CSI feedback configuration request of message No. 2.

6. CSI Feedback may be modified by the DL CI of the base station MAC.

Here, the Periodic CSI report configuration using PUSCH is however performed through the following process. Aperiodic Off(00)/On(01, 10, 11) associated with CSI-RS resources configured with RRC using two bits of CSI Request Field and Aperiodic CSI report mode on PUSCH are determined. And, in the case of JP, the final muting pattern may be dynamically modified using three-bit map in DCI Format 2C in a maximum of three CRS patterns configured in RRC upon PDSCH RE mapping. Further, for downlink UE Specific RS configuration, VCI value and Scrambling Identity to be used by the UE as UE Specific RS sequence initial value may be dynamically modified using DCI Field (In DCI, scrambling identity values in DCI Format 2B and Format 2C are modified to finally determine VCI values to be used). At this time, UE Nos. 4 and 5 feedback (PMI/RI/CQI) may be utilized for MAC scheduling and Rank/PMI (re)configuration.

[CoMP Activation Procedure—Joint Processing (P2~P3)]

7. JT (Joint Transmission) may be achieved on each PDSCH of RRH1 and RRH2 using PDCCH of RRH1.

8. JR (Joint Reception) may be achieved on each PUSCH of RRH1 and RRH2 using PDCCH of RRH1.

Figure 18:
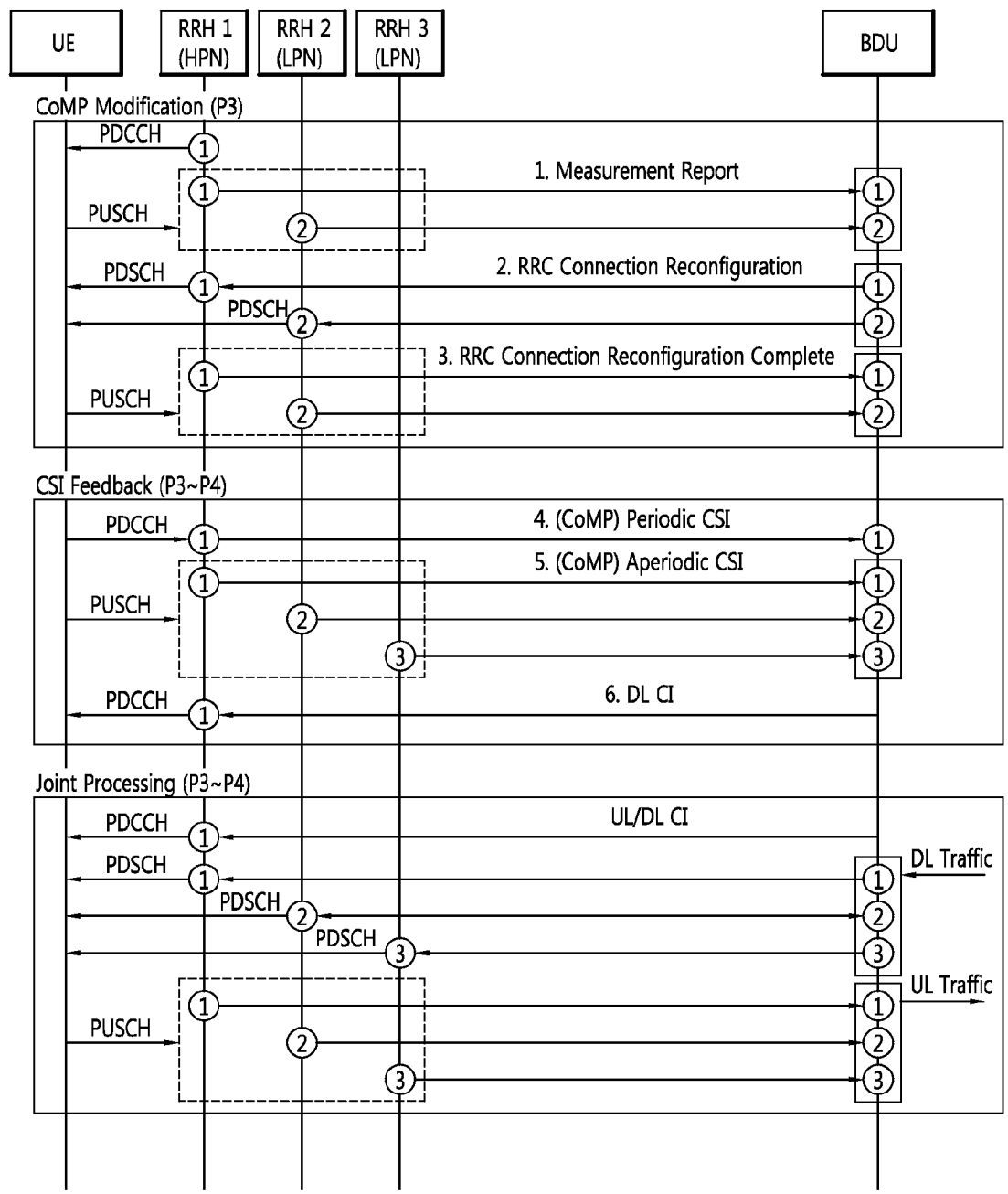
FIG. 18 is a detailed flowchart specifically illustrating a CoMP add modify procedure for adding RRH3 among CoMP services of RR1 and RR2.

FIG. 18 is a detailed flowchart specifically illustrating a CoMP add modify procedure for adding RRH3 among CoMP services of RR1 and RR2.

Referring to FIG. 18, CoMP add modification (Modification 1) is a process for adding RRH3 to the existing CoMP services of RRH1 and RRH2. The base station makes determination based on what is included in the measurement report providing measurement information for CSI-RS through the CoMP Preparation procedure shown in FIG. 16, performs CoMP Modification (P3) procedure for RRH3 under the circumstance that CoMP service is initiated in RRH 1 and RRH 2, and CSI feedback (P3~P4) is performed in the section from P3 to P4 based on the CSI configuration modification information of RRC for the performed information-based CoMP measurement set (RRH1, RRH2, RRH3), and the base station MAC may modify the feedback configuration through DL CI. Further, under the assumption that JP (Joint Processing), a sort of CoMP scheme, is fulfilled, JT (Joint Transmission) and JR (Joint Reception) for RRH1, RRH2, and RRH3 on uplink and downlink may be performed. The detailed CoMP add modify (Modification 1) procedure is as follows.

[CoMP Modification Procedure 1—CoMP Modification (P3)]

1. By analyzing measurement information of the measurement report based on the CoMP Preparation procedure shown in FIG. 16, the base station determines whether to include RRH3, as well as RRH1 and RRH2 in the CoMP Measurement Set.

2. If in the determination of the base station based on the message of item 1, CoMP service is possible in RRH1, RRH2 and RRH3, the base station transmits configuration information modification for CSI Feedback relating to RRH1, RRH2 and RRH3 for CoMP service to the UE through an RRC Connection Reconfiguration message.

3. UE prepares for CSI Feedback according to the CSI Feedback configuration information modification request of the RRC message 2, and if the preparation is complete, transmits an RRC Connection Reconfiguration Complete to the base station. At this time, JP concepts for RRH1 and RRH2 may apply to the RRC message.

[CoMP Modification Procedure 1—CSI Feedback (P3~P4)]

4. UE may perform (CoMP) Periodic CSI feedback on PUCCH for RRH1, RRH2, and RRH3 according to the CSI Feedback configuration modification request of the RRC message 2.

5. UE may perform (CoMP) Aperiodic CSI feedback on PUSCH for RRH1, RRH2, and RRH3 according to the CSI Feedback configuration modification request of the RRC message 2.

6. CSI Feedback may be modified by DL CI of the base station MAC.

[CoMP Modification Procedure 1—Joint Processing (P3~P4) Procedure]

7. JT (Joint Transmission) may be achieved on each PDSCH of RRH1, RRH2, and RRH3 using PDCCH of RRH1.

8. JR (Joint Reception) may be achieved on each PUSCH of RRH1, RRH2, and RRH3 using PDCCH of RRH1.

Figure 19:
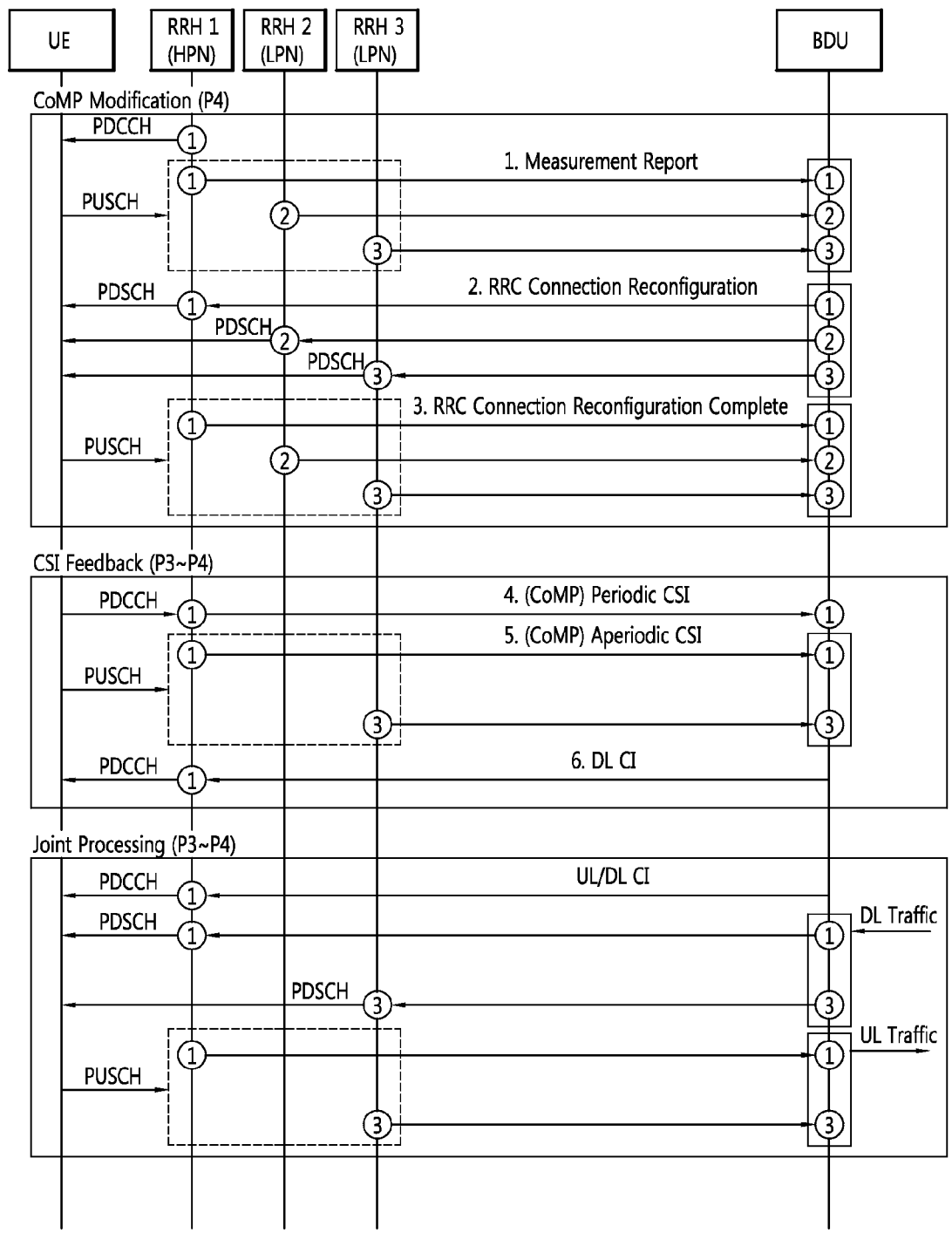
FIG. 19 is a detailed flowchart specifically illustrating a CoMP delete modify procedure for excluding RRH2 among RRH1, RRH2, and RRH3.

FIG. 19 is a detailed flowchart specifically illustrating a CoMP delete modify procedure for excluding RRH2 among RRH1, RRH2, and RRH3.

Referring to FIG. 19, the CoMP delete modification (Modification 2) is a process of excluding RRH2 from being CoMP serviced among RRH1, RRH2, and RRH3 participating in the CoMP service. Based on what is included in the measurement report providing the measurement report for CSI-RS through the CoMP Preparation procedure shown in FIG. 16, the base station makes determination to perform a CoMP Modification 2(P4) for excluding RRH2 from the CoMP service under the situation that CoMP has been currently initiated in RRH1, RRH2, and RRH3, and based on the RRC CSI configuration information for CoMP Measurement Set (RRH1, RRH3) based on the performed information, CSI Feedback (P4-P5) is performed in the section from P4 to P5, and the base station MAC may modify the Feedback configuration through DL CI. Further, under the assumption that JP (Joint Processing), a sort of CoMP scheme, is achieved, although RRH2 has been excluded from CoMP scheme, JT (Joint Transmission) and JR (Joint Reception) for RRH1 and RRH3 may continue on uplink and downlink. A detailed CoMP Modification procedure 2 is as follows.

[CoMP Modification Procedure 2—CoMP De-Activation (P4)]

1. By analyzing the measurement information of the measurement report based on the CoMP Preparation procedure shown in FIG. 16, the base station determines to exclude RRH2 from RRH1, RRH2, and RRH3 included in the CoMP measurement set.

2. If in the determination of the base station based on RRC message 1, the CoMP service is possible in RRH1 and RRH3, the base station transmits configuration information modification for CSI Feedback relating to RRH1 and RRH3 for the CoMP service to the UE through an RRC Connection Reconfiguration message.

3. UE prepares for CSI Feedback according to the CSI Feedback configuration information modification request of RRC message 2, and if the preparation is complete, transmits an RRC Connection Reconfiguration Complete to the base station. At this time, JR concept for RRH1, RRH2, and RRH3 may apply to RRC message.

[CoMP Modification Procedure 2—CSI Feedback (P4~P5)]

4. UE may perform (CoMP) Periodic CSI feedback on PUCCH for RRH1 and RRH3 according to the CSI Feedback configuration modification request of message No. 2.

5. UE may perform (CoMP) Aperiodic CSI feedback on PUSCH for RRH1 and RRH3 according to the CSI Feedback configuration modification request of message No. 2.

6. CSI Feedback may be modified by DL CI of the base station MAC.

[CoMP Modification Procedure 2—Joint Processing (P4~P5)]

7. JT (Joint Transmission) may be achieved on each PDSCH of RRH1 and RRH3 using PDCCH of RRH1.

8. JR (Joint Reception) may be achieved on each PUSCH of RRH1 and RRH3 using PDCCH of RRH1.

Figure 20:
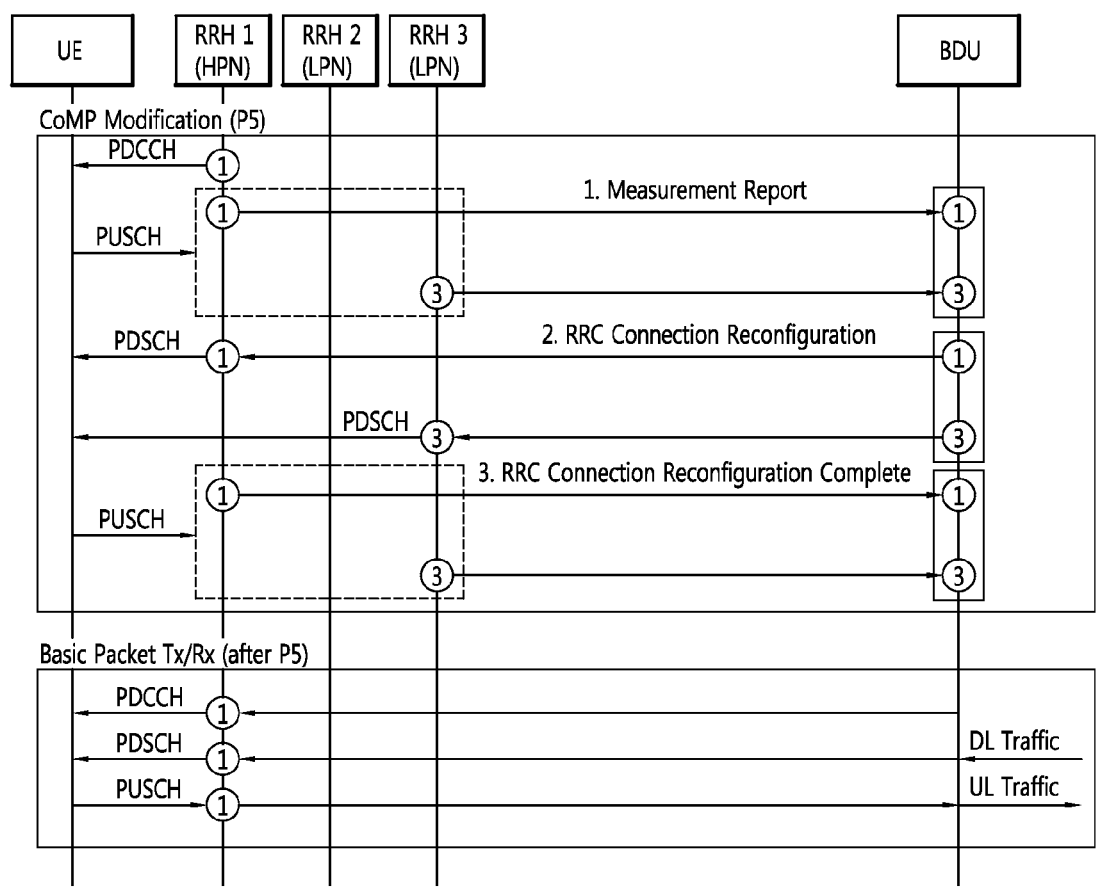
FIG. 20 is a detailed flowchart specifically illustrating a CoMP deactivation procedure for deactivating CoMP service by excluding RRH3 from CoMP service of RRH1 and RRH3.

FIG. 20 is a detailed flowchart specifically illustrating a CoMP deactivation procedure for deactivating CoMP service by excluding RRH3 from CoMP service of RRH1 and RRH3.

Referring to FIG. 20, the CoMP deactivation procedure is a process of deactivating CoMP service by excluding RRH3 from RRH1 and RRH3 participating in the CoMP service. Based on what is included in the measurement report providing measurement information for CSI-RS through the CoMP Preparation procedure shown in FIG. 16, the base station makes determination to perform a CoMP De-activation (P5) procedure for RRH3 under the situation that CoMP has been currently initiated in RRH1 and RRH3, and based on the release configuration information of RRC CoMP CSI Feedback based on the performed information, CoMP CSI Feedback is enabled not to be performed any longer. Further, JP (Joint Processing), a sort of CoMP scheme, is not conducted any more, and basic packet transmission and reception are carried out through RRH1 on uplink and downlink. A detailed CoMP De-activation procedure is as follows.

[CoMP De-Activation Procedure—CoMP De-Activation (P5)]

1. by analyzing measurement information of the measurement report based on the CoMP Preparation procedure shown in FIG. 16, the base station determines to release CoMP service.

2. If in the determination of the base station based on RRC message 1, the CoMP service is determined to be deactivated, packet transmission and reception are possible in RRH1, the base station transmits through an RRC Connection Reconfiguration message to the UE configuration information modification that allows CoMP CSI Feedback associated with the CoMP service to be performed.

3. If the modification is complete according to the CSI Feedback configuration modification request of the RRC message 2, the UE transmits RRC Connection Reconfiguration Complete to the base station. At this time, JP concept for RRH1 and RRH3 may apply to RRC message.

[CoMP De-Activation Procedure—Basic Packet Tx/Rx (after P5) Procedure]

4. downlink packet transmission may be achieved on PDSCH of RRH1 using PDCCH of RRH1.

5. uplink packet transmission may be achieved on PUSCH of RRH1 using PDCCH of RRH1.

Although the embodiments of the present invention have been described with the accompanying drawings, it should be understood by those of ordinary skill that the scope of the present invention is not limited thereto and rather various modifications and variations may be made thereto without departing from the scope of the invention defined by the appended claims.

What is claimed is:

1. A method of performing coordinated multi-point (CoMP) transmission and reception in an overlaid cellular system in which a first base station and a second base station overlay each other, the method comprising:
   performing a handover using a coordinated multi-point (CoMP) transmission and reception scheme based on Channel State Indicator-Reference Signal (CSI-RS) information of user equipment by the first and second base stations, wherein performing the handover comprises:
   a coordinated multi-point add modification step for adding a third base station that is included in the first base station and that is a neighboring cell of the second base station while the coordinated multi-point transmission and reception is performed by the first and second base stations;
   a coordinated multi-point exclude modification step of excluding the second base station while the coordinated multi-point transmission and reception is performed by the first, second, and third base stations; and
   a termination step of terminating the coordinated multi-point transmission and reception by excluding the third base station from the coordinated multi-point transmission and reception attended by the first and third base stations.

2. The method of claim 1, wherein performing the handover comprises:
   preparing for performing coordinated multi-point transmission and reception based on the CSI-RS information of the user equipment by the first base station; and
   initiating coordinated multi-point transmission and reception by the first and second base stations.

3. The method of claim 1, wherein the first base station is a base station covering a macro cell, and the second base station is a neighboring cell covering a pico cell or a femto cell included in the macro cell covered by the first base station.

4. The method of claim 1, wherein performing the handover comprises a basic packet transmission and reception step of transmitting and receiving downlink and uplink packets respectively using a PDSCH (Physical Downlink Shared Channel) and a PUSCH (Physical Uplink Shared Channel) by DL/UL grant information of CI (Control Information) information and a PDCCH (Physical Downlink Control Channel) by the user equipment accessing an RRH (Remote Radio Head) of the first base station.

5. The method of claim 2, wherein the coordinated multi-point transmission and reception preparation step comprises:
controlling the measurement information configuration of the user equipment by a radio resource control (RRC) of the first base station using an RRC connection reconfiguration message;
preparing measurement by the user equipment according to a measurement control request of the RRC connection reconfiguration message and transmitting a measurement preparation complete message to the first base station; and
reporting a measurement report for the CSI-RS (Channel State Indicator-Reference Signal) to the first base station by the user equipment based on a measurement control determination reference and a reporting scheme provided from the first base station.

6. The method of claim 2, wherein initiating the coordinated multi-point transmission and reception comprises:
analyzing the measurement report provided from the user equipment by the first base station, determining whether to include the second base station in the coordinated multi-point measurement set by the first base station, and transmitting configuration information for per-UE CSI feedback relating to the first and second base stations based on the determination to the user equipment;
preparing for CSI feedback according to a CSI feedback configuration request of the first RRC connection reconfiguration message by the user equipment, and when the preparation is complete, transmitting an RRC connection reconfiguration complete message to the first base station by the user equipment;
performing CSI feedback on a PUCCH or a PUSCH for the first and second base stations according to a CSI feedback configuration request by the user equipment; and
performing a JT (Joint Transmission) or a JR (Joint Reception) on a PDSCH or PUSCH of each of the first base station and the second base station using the PDCCH of the first base station.

7. The method of claim 1, wherein the coordinated multi-point add modification step comprises:
analyzing the measurement report provided from the user equipment by the first base station, determining whether to include the third base station in a coordinated multi-point measurement set including the first and second base stations by the first base station, and transmitting a configuration information modification for per-UE CSI feedback relating to the first and second base stations to the user equipment through a second RRC connection reconfiguration message by the first base station;
preparing for CSI feedback according to a CSI feedback configuration modification request of the second RRC connection reconfiguration message by the user equipment, and when the preparation is complete, transmitting a second RRC connection reconfiguration complete message to the first base station by the user equipment;
performing CSI feedback on a PUCCH or PUSCH for the first base station, the second base station, and the third base station according to a CSI feedback configuration request of the second RRC connection reconfiguration message by the user equipment; and
performing a joint transmission or a joint reception on PDSCH or PUSCH of each of the first base station, the second base station, and the third base station using the PDCCH of the first base station.

8. The method of claim 1, wherein the coordinated multi-point exclude modification step comprises:
analyzing a measurement report provided from the user equipment by the first base station, determining whether or not to include the second base station in a coordinated multi-point measurement set including the first base station, the second base station, and the third base station, and if it is determined that coordinated multi-point transmission and reception is possible in the first base station and the third base station, transmitting a configuration information modification for per-UE CSI feedback relating to the first base station and the third base station to the user equipment through a third RRC connection reconfiguration message;
preparing for CSI feedback according to a CSI feedback configuration modification request of the third RRC connection reconfiguration message by the user equipment, and if the preparation is complete, transmitting a third RRC connection reconfiguration complete message to the first base station;
performing CSI feedback on a PUCCH or a PUSCH for the first base station and the third base station according to the CSI feedback configuration modification request of the third RRC connection reconfiguration message by the user equipment; and
performing a joint transmission or a joint reception on the PDSCH or PUSCH of each of the first base station and the third base station using the PDCCH of the first base station.

9. The method of claim 1, wherein the coordinated multi-point transmission and reception terminating step comprises:
analyzing a measurement report provided from the user equipment by the first base station, determining whether to release the coordinated multi-point transmission and reception, and if the coordinated multi-point transmission and reception is determined to be released, transmitting a configuration information modification allowing CSI feedback associated with the coordinated multi-point transmission and reception not to be performed to the user equipment through a fourth RRC connection reconfiguration message by the first base station; and
if the modification is complete according to the CSI feedback configuration modification request of the fourth RRC connection reconfiguration message, transmitting a fourth RRC connection reconfiguration complete message to the first base station.

10. A method of scheduling a per-UE (User Equipment) RS (Reference Signal) for coordinated multi-point (CoMP) transmission and reception by an HPN base station scheduler in an environment where an HPN (High Power Node) cell and an LPN (Low Power Node) cell co-exist, the method comprising:
allocating an RS RE (Reference Signal Resource Element) relating to a per-cell CSI-RS (Channel State Indicator-Reference Signal) for the HPN and LPN cells;

determining whether to apply coordinated multi-point transmission and reception based on entire quality information for a CSI-RS-related RE (Resource Element) during a constant period;

extracting a CSI-RS-related RE in an RB (Resource Block) allocated to a per-UE subframe by user equipment;

calculating an entire quality for the extracted CSI-RS-related RE during a constant period by the user equipment; and determining whether to apply coordinated multi-point transmission and reception based on the calculated entire quality information by the HPN base station scheduler, wherein the HPN base station scheduler allocates a CRS (Cell-specific Reference Signal) port to an RE corresponding to first and second rows and third, sixth, ninth, and twelfth columns of a PDCCH (Physical Downlink Control Channel) of a PRB (Physical Resource Block) and allocates a CSI-RS port to an RE corresponding to seventh and eighth rows and third, fourth, ninth, and tenth columns of the PRB not to overlap per base station.

11. A scheduling apparatus for scheduling a per-UE (User Equipment) RS (Reference Signal) for coordinated multi-point (CoMP) transmission and reception in an environment where an HPN (High Power Node) cell and an LPN (Low Power Node) cell co-exist, the scheduling apparatus comprising:

a scheduler in a base station configured to:
allocate an RS RE (Reference Signal Resource Element) relating to a per-cell CSI-RS (Channel State Indicator-Reference Signal) for the HPN and LPN cells;

extract a CSI-RS-related RE (Resource Element) in an RB (Resource Block) allocated to a per-UE subframe by user equipment;

calculate an entire quality for the extracted CSI-RS-related RE during a constant period by the user equipment; and determine whether to apply coordinated multi-point transmission and reception based on the calculated entire quality information, wherein the scheduling apparatus determines whether to apply coordinated multi-point transmission and reception based on entire quality information for a CSI-RS-related RE during a constant period, and wherein the scheduling apparatus allocates a CRS (Cell-specific Reference Signal) port to an RE corresponding to first and second rows and third, sixth, ninth, and twelfth columns of a PDCCH (Physical Downlink Control Channel) of a PRB (Physical Resource Block) and allocates a CSI-RS port to an RE corresponding to seventh and eighth rows and third, fourth, ninth, and tenth columns of the PRB not to overlap per base station.

12. A downlink scheduling method for coordinated multi-point (CoMP) transmission and reception in an environment where an HPN (High Power Node) cell and an LPN (Low Power Node) cell co-exist, performed by a base station scheduler, the scheduling method comprises:

performing scheduling for the coordinated multi-point transmission and reception for a base station covering at least one LPN cell by anchoring a PDCCH (Physical Downlink Control Channel) channel of a base station covering the HPN cell, extracting a CSI-RS (Channel State Indicator-Reference Signal) related RE (Resource Element) in an RB (Resource Block) allocated to a per-UE subframe by user equipment (UE);

calculating an entire quality for the extracted CSI-RS-related RE during a constant period by the user equipment; and determining whether to apply coordinated multi-point transmission and reception based on the calculated entire quality information by the base station scheduler, wherein only the PDCCH channel of the HPN cell is used for the scheduling of the at least one LPN cell, and wherein the base station scheduler allocates a CRS (Cell-specific Reference Signal) port to an RE corresponding to first and second rows and third, sixth, ninth, and twelfth columns of a PDCCH of a PRB (Physical Resource Block) and allocates a CSI-RS port to an RE corresponding to seventh and eighth rows and third, fourth, ninth, and tenth columns of the PRB not to overlap per base station.

13. A scheduling apparatus for performing downlink scheduling for coordinated multi-point (CoMP) transmission and reception in an environment where an HPN (High Power Node) cell and an LPN (Low Power Node) cell co-exist, the scheduling apparatus comprising:

a scheduler in a base station configured to
perform scheduling for the coordinated multi-point transmission and reception for a base station covering at least one LPN cell by anchoring a PDCCH (Physical Downlink Control Channel) channel of a base station covering the HPN cell, extract a CSI-RS-related RE (Resource Element) in an RB (Resource Block) allocated to a per-UE subframe by user equipment (UE);

calculate an entire quality for the extracted CSI-RS-related RE during a constant period by the user equipment; and determine whether to apply coordinated multi-point transmission and reception based on the calculated entire quality information, wherein only the PDCCH channel of the HPN cell is used for the scheduling of the at least one LPN cell, and wherein the scheduling apparatus allocates a CRS (Cell-specific Reference Signal) port to an RE corresponding to first and second rows and third, sixth, ninth, and twelfth columns of a PDCCH of a PRB (Physical Resource Block) and allocates a CSI-RS port to an RE corresponding to seventh and eighth rows and third, fourth, ninth, and tenth columns of the PRB not to overlap per base station.

* * * * *